United States Patent
Lim et al.

(10) Patent No.: US 10,581,102 B2
(45) Date of Patent: Mar. 3, 2020

(54) CERIA ELECTROLYTE FOR LOW-TEMPERATURE SINTERING AND SOLID OXIDE FUEL CELL USING THE SAME

(71) Applicant: KCERACELL CO., LTD., Chungcheongnam-do (KR)

(72) Inventors: Kyoung Tae Lim, Daejeon (KR); Hee Lak Lee, Daejeon (KR); Hyeong Cheol Shin, Daejeon (KR); Choong Hwan Lee, Daejeon (KR); Byung Sub Kim, Daejeon (KR); Jae Hwa Choi, Daejeon (KR); Su Jeong Lee, Chungcheongnam-do (KR)

(73) Assignee: KCERACELL CO., LTD., Chungcheongnam-do (KR)

( * ) Notice: Subject to any disclaimer, the term of this patent is extended or adjusted under 35 U.S.C. 154(b) by 145 days.

(21) Appl. No.: 15/989,835

(22) Filed: May 25, 2018

(65) Prior Publication Data

US 2018/0309148 A1    Oct. 25, 2018

Related U.S. Application Data

(62) Division of application No. 15/066,246, filed on Mar. 10, 2016, now Pat. No. 10,008,731.

(30) Foreign Application Priority Data

Aug. 27, 2015 (KR) .................. 10-2015-0121105
Oct. 19, 2015 (KR) .................. 10-2015-0145048

(Continued)

(51) Int. Cl.
*H01M 8/126* (2016.01)
*H01M 8/1253* (2016.01)
(Continued)

(52) U.S. Cl.
CPC ......... *H01M 8/126* (2013.01); *H01M 4/9033* (2013.01); *H01M 8/1253* (2013.01);
(Continued)

(58) Field of Classification Search
CPC ...... H01M 8/126; H01M 8/12; H01M 8/1253; H01M 4/90; H01M 4/88
See application file for complete search history.

(56) References Cited

U.S. PATENT DOCUMENTS 8,895,203 B2 * 11/2014 Marlin ................ H01M 4/8605
429/489
2004/0175949 A1 * 9/2004 Lee ....................... C04B 41/009
438/691
(Continued)

FOREIGN PATENT DOCUMENTS

KR    10-2013-0040640 A     4/2013
KR    10-2013-0099704 A     9/2013
KR    10-1335464 B1        11/2013

*Primary Examiner* — Kenneth J Douyette
(74) *Attorney, Agent, or Firm* — Rabin & Berdo, P.C.

(57) ABSTRACT

Disclosed is a ceria electrolyte for a solid oxide fuel cell, which is a ceria ($CeO_2$) electrolyte configured such that either gadolinium (Gd) or samarium (Sm) is co-doped with ytterbium (Yb) and bismuth (Bi), wherein Bi is doped in an amount of 0.5 to 5 mol %, thus exhibiting low-temperature sintering properties.

4 Claims, 18 Drawing Sheets

(30) Foreign Application Priority Data

Dec. 1, 2015 (KR) .......................... 10-2015-0169879
Dec. 1, 2015 (KR) .......................... 10-2015-0169889

(51) Int. Cl.
*H01M 4/90* (2006.01)
*H01M 8/124* (2016.01)

(52) U.S. Cl.
CPC ............... *H01M 2008/1293* (2013.01); *H01M 2300/0077* (2013.01); *Y02E 60/525* (2013.01); *Y02P 70/56* (2015.11)

(56) References Cited

U.S. PATENT DOCUMENTS

| | | | | |
|---|---|---|---|---|
| 2008/0003487 A1* | 1/2008 | Takizawa | ................ | C01G 1/02 |
| | | | | 429/488 |
| 2013/0040212 A1* | 2/2013 | Ebbesen | ................ | B01D 53/02 |
| | | | | 429/410 |

* cited by examiner

CERIA ELECTROLYTE FOR LOW-TEMPERATURE SINTERING AND SOLID OXIDE FUEL CELL USING THE SAME

CROSS-REFERENCE RELATED APPLICATIONS

This application is a divisional application of U.S. application Ser. No. 15/066,246, filed Mar. 10, 2016, now U.S Pat. No. 10,008,731, the disclosure of which is incorporated herein by reference. This application claims priority benefits under 35 U.S.C. § 1.119 to Korean Patent Application Nos. 10-2015-0121105 filed Aug. 27, 2015, 10-2015-0145048 filed Oct. 19, 2015, 10-2015-0169879 filed Dec. 1, 2015 and 10-2015-0169889 filed Dec. 1, 2015.

BACKGROUND OF THE INVENTION

1. Field of the Invention

The present invention relates to a ceria electrolyte for low-temperature sintering of a solid oxide fuel cell (SOFC) and, more particularly, to a ceria ($CeO_2$) electrolyte and a solid oxide fuel cell using the same, in which the ceria electrolyte is configured such that either gadolinium (Gd) or samarium (Sm) is co-doped with ytterbium (Yb) and bismuth (Bi), thus exhibiting low-temperature sintering properties.

2. Description of the Related Art

Recently, in order to reduce the operating temperature of a solid oxide fuel cell (SOFC) to ensure the high-temperature stability thereof and to prevent the power of the solid oxide fuel cell from decreasing due to the reduction in the operating temperature, high-performance materials are being actively applied. Currently widely useful as an electrolyte material for a unit cell for a solid oxide fuel cell is a zirconia-based electrolyte such as 8YSZ (8 mol % $Y_2O_3$ stabilized $ZrO_2$).

Initially, with regard to unit cells using a zirconia-based electrolyte such as 8YSZ, a cathode material contains a composite comprising LSM (Sr-doped $LaMnO_3$), as a pure electron conductor, and an electrolyte material. Recently, however, to increase the power density ($W/cm^2$) of the unit cell, the use of a mixed ionic and electronic conductor (MIEC) such as LSCF (Sr- & Co-doped $LaFeO_3$), having superior oxygen ionization catalytic properties and high electrical conductivity even at low temperatures, is drastically increasing as the cathode material.

However, most MIEC cathode materials such as LSCF are problematic because they may react with the zirconia electrolyte at the interface therebetween in the thermal treatment temperature range of the cathode, undesirably forming non-conductive reaction products. Hence, in order to prevent the MIEC cathode such as LSCF and the zirconia electrolyte from reacting at high temperatures, a buffer layer (BL) is additionally provided between the cathode and the electrolyte.

In particular, a ceria-based electrolyte (Gd- or Sm-doped $CeO_2$) comprising pure $CeO_2$ and 5 to 10 mol % of $Gd_2O_3$ or $Sm_2O_3$ has high oxygen ionic conductivity and does not react with MIEC cathodes, and is thereby widely utilized as a material for a buffer layer, which is interposed between the zirconia ($ZrO_2$)-based electrolyte membrane of the solid oxide fuel cell and the MIEC cathode layer so as to prevent the production of a reaction product between the electrolyte and the cathode.

Useful as the buffer layer, a ceria-based electrolyte is characterized by forming an isomorphous solid solution with a zirconia electrolyte at a high temperature of 1300° C. or higher, in which the solid solution, formed at a high temperature through mutual diffusion, has very low ionic conductivity, consequently deteriorating the power of the unit cell.

The fabrication of a unit cell using a ceria-based buffer layer includes two types of methods, one method including forming an anode support, a zirconia-based electrolyte and a ceria electrolyte into a laminated molded body that is then co-sintered, and the other method including forming an anode support and a zirconia electrolyte into a laminated molded body that is then sintered, coating the surface of the electrolyte membrane with a ceria buffer layer, and then thermally treating it.

Thus, when the unit cell is manufactured by co-sintering the ceria-based electrolyte and the zirconia electrolyte, co-sintering at a temperature of 1300° C. or lower is required, but the zirconia electrolyte has to be subjected to a sintering temperature of 1350° C. or higher in order to attain the dense microstructure of 95% or more typically required of electrolytes.

Also, when the ceria-based buffer layer is formed by preparing a dense electrolyte through sintering at 1350° C. or higher and coating and thermally treating the surface of the electrolyte, the already-sintered electrolyte membrane does not shrink, undesirably making it difficult to form a dense ceria-based electrolyte and increasing the processing time and cost due to the additional coating and thermal treatment.

Supposing that the thermal treatment temperature of the ceria-based electrolyte used as the buffer layer is lowered to the thermal treatment temperature of the cathode, the ceria-based electrolyte and the cathode may be thermally treated simultaneously, thus reducing the processing time and ensuring a dense microstructure even at a low temperature, thereby improving the power characteristics of the unit cell.

Therefore, techniques for decreasing the thermal treatment temperature of the ceria-based electrolyte to 1150° C., corresponding to the thermal treatment temperature of the cathode, are required.

CITATION LIST

Patent Literature

Patent Document 1: Korean Patent Application Publication No. 10-2013-0040640
Patent Document 2: Korean Patent Application Publication No. 10-2013-0099704

SUMMARY OF THE INVENTION

Accordingly, the present invention has been made keeping in mind the above problems encountered in the related art, and an object of the present invention is to provide a ceria electrolyte, wherein a conventional Gd-doped $CeO_2$ (GDC) electrolyte or an Sm-doped $CeO_2$ (SDC) electrolyte is further doped with Bi to decrease the thermal treatment temperature thereof to 1150° C., which corresponds to the thermal treatment temperature of a cathode, and is simultaneously doped with a small amount of Yb to prevent the average cation radius from increasing due to the additional doping with Bi and to prevent the ionic conductivity from decreasing, thereby lowering the sintering temperature below that of typical ceria electrolytes.

In order to accomplish the above object, the present invention provides a ceria ($CeO_2$) electrolyte for low-temperature sintering, configured such that either gadolinium (Gd) or samarium (Sm) is co-doped with ytterbium (Yb) and bismuth (Bi) to exhibit low-temperature sintering properties.

The ceria ($CeO_2$) electrolyte may have an average cation radius of 0.98 to 0.99 Å.

The ceria ($CeO_2$) electrolyte may be configured such that gadolinium (Gd), ytterbium (Yb) and bismuth (Bi) are co-doped to exhibit low-temperature sintering properties, and has a composition of Chemical Formula 1 below.

$$Gd_xYb_yBi_zCe_{1-x-y-z}O_2-\delta \quad \text{[Chemical Formula 1]}$$

$0.05 \leq X \leq 0.15$, $0.005 \leq Y \leq 0.05$, $0.005 \leq Z \leq 0.05$, $0.06 \leq X+Y+Z \leq 0.25$, $\delta=(X+Y+Z)/2$ The ceria ($CeO_2$) electrolyte, comprising Gd, Yb and Bi, which are co-doped, may have an average cation radius of 0.98 to 0.99 Å.

The ceria ($CeO_2$) electrolyte may be configured such that samarium (Sm), ytterbium (Yb) and bismuth (Bi) are co-doped to exhibit low-temperature sintering properties, and has a composition of Chemical Formula 2 below.

$$Sm_xYb_yBi_zCe_{1-x-y-z}O_2-\delta \quad \text{[Chemical Formula 2]}$$

$0.1 \leq X \leq 0.17$, $0.005 \leq Y \leq 0.05$, $0.005 \leq Z \leq 0.05$, $0.11 \leq X+Y+Z \leq 0.27$, $\delta=(X+Y+Z)/2$ In addition, the present invention provides a solid oxide fuel cell, comprising: an anode; a zirconia electrolyte, formed through co-sintering with the anode; a ceria buffer layer, formed by coating a surface of the zirconia electrolyte with the above ceria electrolyte and performing thermal treatment at 1100 to 1200° C.; and a cathode, formed through coating and thermal treatment on a surface of the ceria buffer layer.

The zirconia electrolyte may be a fluorite-type stabilized zirconia-based electrolyte and may have a composition of Chemical Formula 3 below.

$$(Re_2O_3)_x(ZrO_2)_{1-x} \quad \text{[Chemical Formula 3]}$$

Re=at least one element selected from among Y, Sc, Yb, Ce, Gd, and Sm, $0.04 \leq X \leq 0.11$ The cathode may comprise a mixed conductor having a perovskite ($ABO_3$)-based crystal structure with both electronic and oxygen ionic conductivities, and may have a composition of Chemical Formula 4 below.

$$ABO_3 \quad \text{[Chemical Formula 4]}$$

A=at least one element selected from among La, Sm, Pr, Ba, Sr, and Ca
B=at least one element selected from among Fe, Co, Ni, and Cu
A and B have a content ratio of $0.95 \leq A/B \leq 1$ The cathode may comprise a mixed conductor having a double-layer perovskite ($ABC_2O_{5+\delta}$)-based crystal structure with both electronic and oxygen ionic conductivities, and may have a composition of Chemical Formula 5 below.

$$ABC_2O_{5+\delta} \quad \text{[Chemical Formula 5]}$$

A=at least one element selected from among La, Sm, Nd, and Pr
B=at least one element selected from among Ba, Sr, and Ca
C=at least one element selected from among Co, Fe, Ni, Cu, and Mn The cathode may comprise 50 to 70 wt % of a mixed conductor having a perovskite ($ABO_3$)-based crystal structure or a mixed conductor having a double-layer perovskite ($ABC_2O_{5+\delta}$)-based crystal structure and 30 to 50 wt % of a ceria-based electrolyte, and the ceria-based electrolyte may have a composition of Chemical Formula 1 below.

$$Gd_xYb_yBi_zCe_{1-x-y-z}O_2-\delta \quad \text{[Chemical Formula 1]}$$

$0.05 \leq X \leq 0.15$, $0.005 \leq Y \leq 0.05$, $0.005 \leq Z \leq 0.05$, $0.06 \leq X+Y+Z \leq 0.25$, $\delta=(X+Y+Z)/2$ The cathode may comprise 50 to 70 wt % of a mixed conductor having a perovskite ($ABO_3$)-based crystal structure or a mixed conductor having a double-layer perovskite ($ABC_2O_{5+\delta}$)-based crystal structure and 30 to 50 wt % of a ceria-based electrolyte, and the ceria-based electrolyte may have a composition of Chemical Formula 2 below.

$$Sm_xYb_yBi_zCe_{1-x-y-z}O_2-\delta \quad \text{[Chemical Formula 2]}$$

$0.1 \leq X \leq 0.17$, $0.005 \leq Y \leq 0.05$, $0.005 \leq Z \leq 0.05$, $0.11 \leq X+Y+Z \leq 0.27$, $\delta=(X+Y+Z)/2$ The cathode may comprise 50 to 70 wt % of a mixed conductor having a perovskite ($ABO_3$)-based crystal structure or a mixed conductor having a double-layer perovskite ($ABC_2O_{5+\delta}$)-based crystal structure and 30 to 50 wt % of a ceria-based electrolyte, and the ceria-based electrolyte may have a composition of Chemical Formula 6 below.

$$Re_xCe_{1-x}O_2-\delta \quad \text{[Chemical Formula 6]}$$

Re=at least one element selected from among Gd, Sm, Y, Nd, and Pr, $0.05 \leq X \leq 0.2$, $\delta=X/2$ The anode may comprise 30 to 50 wt % of a fluorite-type stabilized zirconia-based electrolyte and 50 to 70 wt % of NiO.

The solid oxide fuel cell may have a unit cell configuration of an anode-supported cell (ASC), an electrolyte-supported cell (ESC), a metal-supported cell (MSC), or a segmented-type cell.

The unit cell may be provided in a planar-type, tubular-type or flat-tube-type form.

According to the present invention, a ceria electrolyte for low-temperature sintering is a ceria ($CeO_2$) electrolyte imparted with low-temperature sintering properties by co-doping either Gd or Sm with Yb and Bi, and can exhibit an average cation radius similar to that of a conventional GDC electrolyte or SDC electrolyte, thereby ensuring a high sintering density of 95% or more even at a sintering temperature of 1150° C. while maintaining the high oxygen ionic conductivity of the conventional GDC electrolyte or SDC electrolyte.

According to the present invention, a solid oxide fuel cell using the ceria electrolyte for low-temperature sintering is configured such that the ceria-based electrolyte can be firmly adhered to a dense electrolyte membrane, which is sintered at 1350° C. or higher by lowering the thermal treatment temperature of the ceria-based electrolyte to 1150° C. or less, corresponding to the thermal treatment temperature of a cathode.

Furthermore, a ceria buffer layer and a MIEC cathode such as LSCF can be simultaneously thermally treated after being continuously applied, thus shortening the processing time and enabling the fabrication of a unit cell having high power density.

The aforementioned effects are set forth to illustrate, but are not to be construed as limiting the scope of the present invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
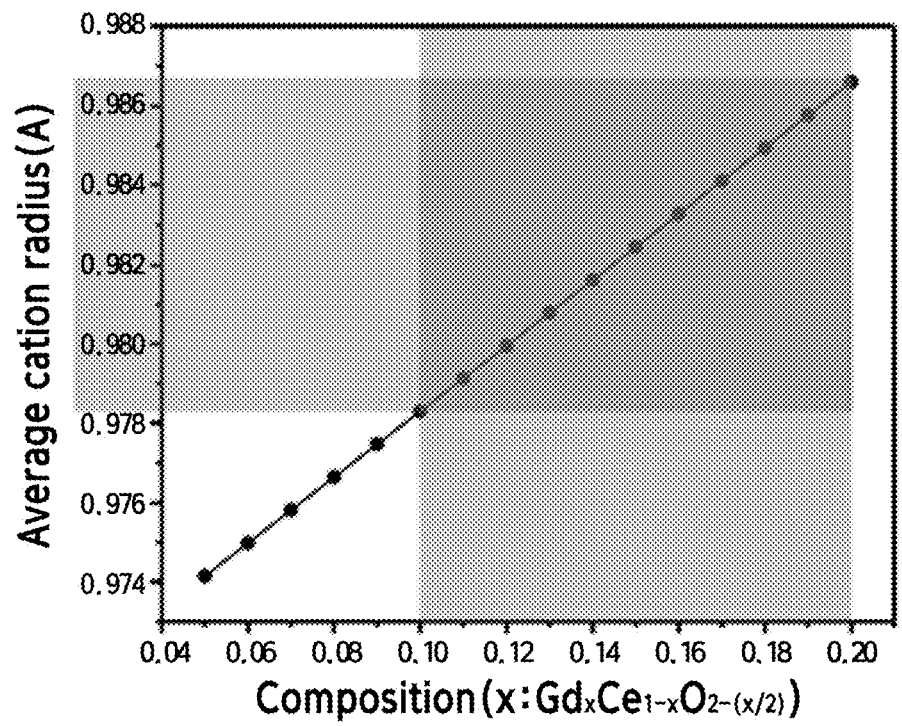
FIG. 1 is a graph illustrating the average cation radius of a commercially available GDC electrolyte.

Hereinafter, a detailed description will be given of preferred embodiments of the present invention with reference to the appended drawings. The embodiments of the present invention are provided to more fully describe the technical spirit of the present invention to those skilled in the art, and may be modified in various ways and are not construed as limiting the present invention. Rather, these embodiments are provided to complete the present disclosure and to fully deliver the technical spirit of the present invention to those skilled in the art. As used herein, the term "and/or" may include any one of the listed items and any combination of one or more thereof. Throughout the drawings, the same reference numerals refer to the same or like parts. Furthermore, various parts and areas in the drawings are schematically depicted. Hence, the technical spirit of the present invention is not limited by the relative sizes or intervals shown in the drawings.

According to the present invention, a ceria electrolyte for low-temperature sintering is configured such that either gadolinium (Gd) or samarium (Sm) is co-doped with ytterbium (Yb) and bismuth (Bi), and may thus ensure low-temperature sintering properties.

The average cation radius of the ceria ($CeO_2$) electrolyte, configured such that either Gd or Sm is co-doped with Yb and Bi, falls in the range of 0.98 to 0.99 Å.

In an embodiment of the present invention, the ceria electrolyte for low-temperature sintering is a ceria ($CeO_2$) electrolyte configured such that Gd, Yb and Bi are co-doped to exhibit low-temperature sintering properties, and may have the composition of Chemical Formula 1 below.

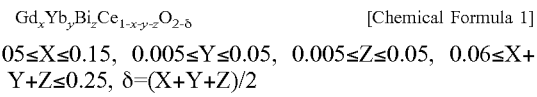

[Chemical Formula 1]

$0.05 \leq X \leq 0.15$, $0.005 \leq Y \leq 0.05$, $0.005 \leq Z \leq 0.05$, $0.06 \leq X+Y+Z \leq 0.25$, $\delta = (X+Y+Z)/2$ The currently commercially available ceria-based electrolyte is represented by $Gd_xCe_{1-x}O_{2-\delta}$. When some $Ce^{4+}$ main lattice ions are doped with $Gd^{3+}$, oxygen vacancies are formed in the lattice and are used as the diffusion path of oxygen ions. The Gd-doped ceria electrolyte is referred to as a GDC electrolyte.

As the amount of doped Gd in the GDC electrolyte is increased, ionic conductivity rises. In the case where Gd is doped in an excessive amount, oxygen vacancies are combined, undesirably deteriorating ionic conductivity. Typically, the amount of doped Gd in the ceria ($CeO_2$) electrolyte falls in the range of 10 to 20 mol %. Given the above amount of doped Gd, the highest ionic conductivity may result. Individual research groups report different compositions that manifest the highest ionic conductivity.

The ceria electrolyte for low-temperature sintering according to the present invention includes Bi as an additional doping element for ensuring the low-temperature sintering properties of the GDC electrolyte and maintaining the high ionic conductivity thereof, and Yb as an additional doping element for preventing the average cation radius from increasing due to the introduction of Bi. The cation radii of $Gd^{3+}$, $Bi^{3+}$, $Ce^{4+}$ and $Yb^{3+}$ are 1.053 Å, 1.17 Å, 0.97 Å, and 0.985 Å, respectively.

The composition of the GDC electrolyte known to have the highest ionic conductivity is represented by $Gd_xCe_{1-x}O_{2-(x/2)}$, where X is 0.1 to 0.2, and the average radius of all the cations in the above composition may be shown in FIG. 1. Based on the calculated results, the cation radii of the commercially available GDC electrolytes may fall in the range of about 0.978 to 0.987 (Å).

Figure 2:
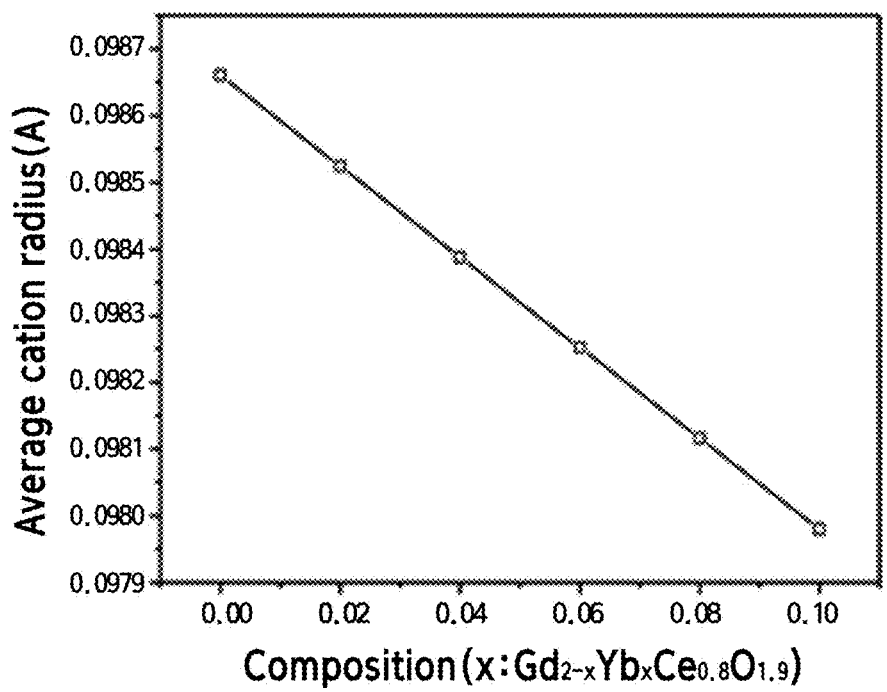
FIG. 2 is a graph illustrating the average cation radius of a Yb-doped GDC electrolyte.

Changes in the cation radius of the Yb-doped GDC electrolyte ($Gd_{2-x}Yb_xCe_{0.8}O_{1.9}$) are shown in FIG. 2. Some Gd ions are doped with Yb having a relatively small ionic radius, and the average cation radius is decreased with an increase in the doped amount thereof, which can be confirmed through calculation.

Figure 3:
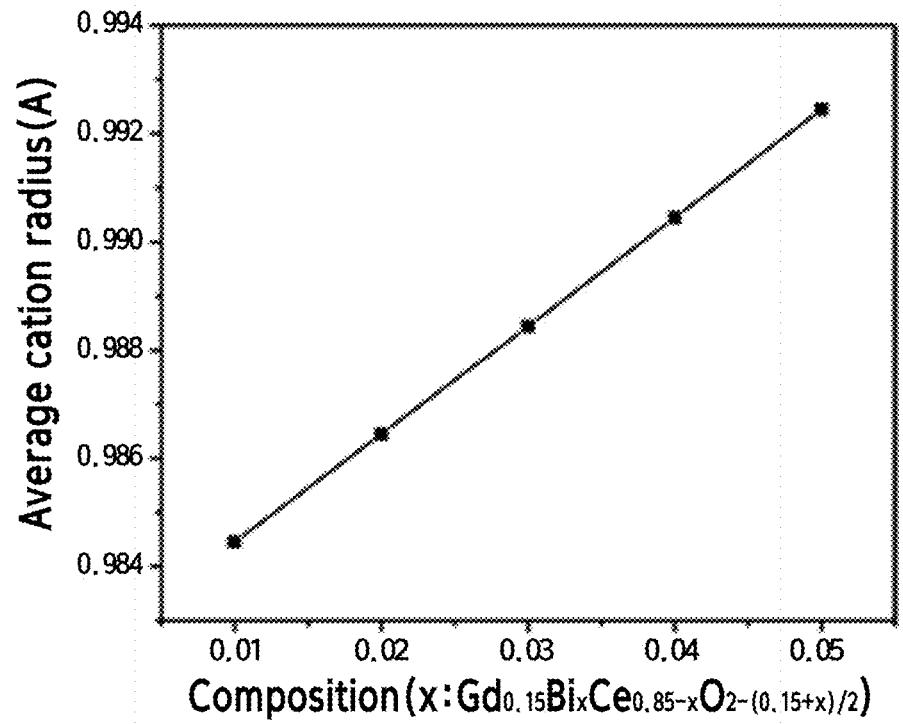
FIG. 3 is a graph illustrating the average cation radius of a Bi-doped GDC electrolyte.

On the other hand, changes in the cation radius of the Bi-doped GDC electrolyte ($Gd_{0.15}Bi_xCe_{0.85-x}O_{2-(0.15+x)/2}$) are shown in FIG. 3, in which the average cation radius may become large with an increase in the amount of doped Bi, which has a relatively large ionic radius compared to Gd and Ce, which can be confirmed through calculation.

Specifically, when Bi is additionally doped to ensure the low-temperature sintering properties of a conventional GDC electrolyte, the average cation radius is increased. This increase in the cation radius may narrow the diffusion path (oxygen vacancies) of oxygen ions, undesirably impeding the efficient conduction of oxygen ions.

In the present invention, hence, Yb, which has an ionic radius smaller than that of Gd, may be co-doped with the goal of suppressing an increase in the average cation radius due to doping with Bi, which has an ionic radius greater than Gd.

Figure 4:
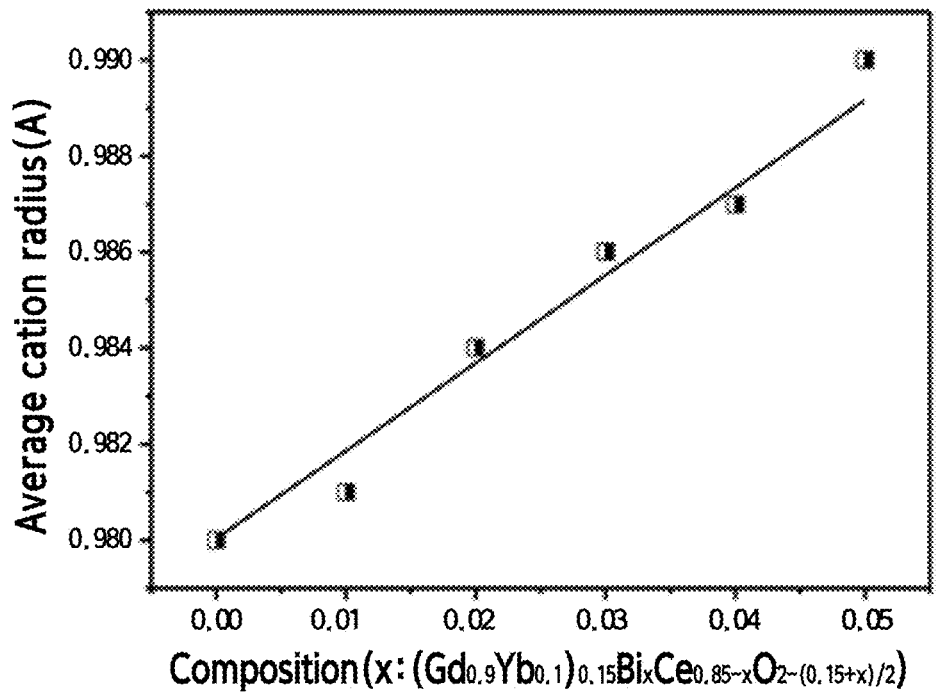
FIG. 4 is a graph illustrating the average cation radius depending on the Bi composition that is doped in the ceria electrolyte according to an embodiment of the present invention.

FIG. 4 is a graph illustrating the average cation radius depending on the Bi composition that is doped in the ceria electrolyte according to an embodiment of the present invention. The average cation radius of the ceria ($CeO_2$) electrolyte, comprising Gd, Yb and Bi, which are co-doped, may fall in the range of 0.98 to 0.99 Å.

In an embodiment of the present invention, the ceria electrolyte for low-temperature sintering is a ceria ($CeO_2$) electrolyte configured such that Sm, Yb and Bi are co-doped to thus ensure low-temperature sintering properties, and may have the composition of Chemical Formula 2 below.

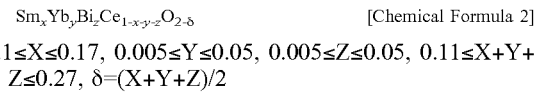

[Chemical Formula 2]

$0.1 \leq X \leq 0.17$, $0.005 \leq Y \leq 0.05$, $0.005 \leq Z \leq 0.05$, $0.11 \leq X+Y+Z \leq 0.27$, $\delta = (X+Y+Z)/2$ The currently commercially available ceria-based electrolyte is represented by $Sm_xCe_{1-x}O_{2-\delta}$. When some $Ce^{4+}$ main lattice ions are doped with $Sm^{3+}$, oxygen vacancies are formed in the lattice and are used as the diffusion path of oxygen ions. The Sm-doped ceria electrolyte is referred to as an SDC electrolyte.

The ceria electrolyte for low-temperature sintering according to the present invention includes Bi as an additional doping element for ensuring the low-temperature sintering properties of the SDC electrolyte and maintaining high ionic conductivity, and Yb as an additional doping element for suppressing an increase in the average cation radius due to the introduction of Bi. The cation radii of $Sm^{3+}$, $Bi^{3+}$, $Ce^{4+}$ and $Yb^{3+}$ are 1.079 Å, 1.17 Å, 0.97 Å, and 0.985 Å, respectively.

Figure 5:
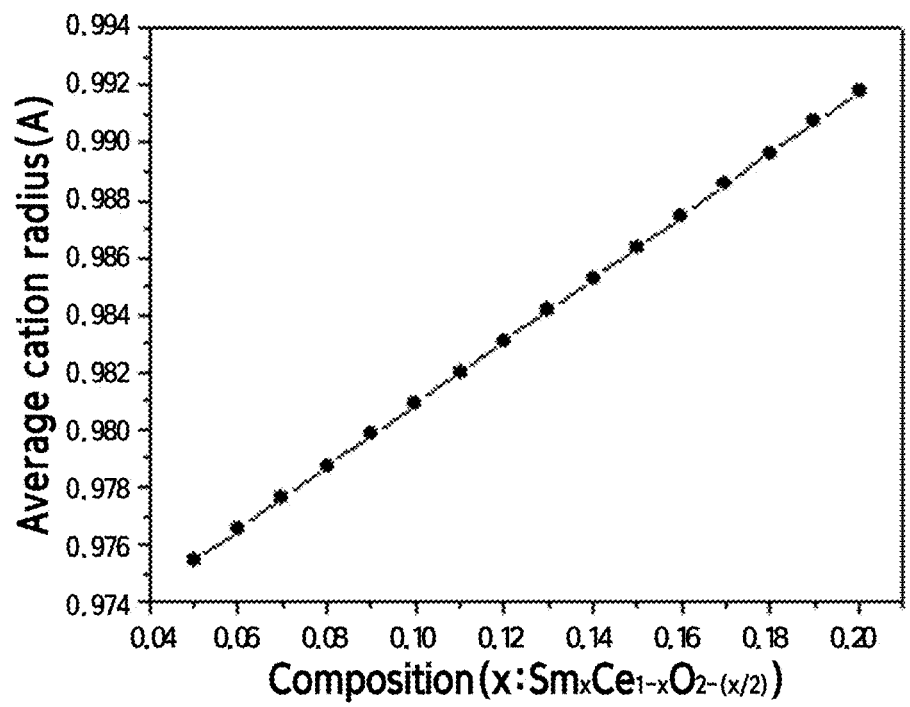
FIG. 5 is a graph illustrating the average cation radius of a commercially available SDC electrolyte.

The composition of the SDC electrolyte known to have the highest ionic conductivity is represented by $Sm_xCe_{1-x}O_{2-(x/2)}$, where X is 0.1 to 0.2, and the average radius of all the cations in the above composition may be shown in FIG. 5. Based on the calculated results, the cation radii of the commercially available SDC electrolytes may fall in the range of about 0.98 to 0.99 (Å).

Figure 6:
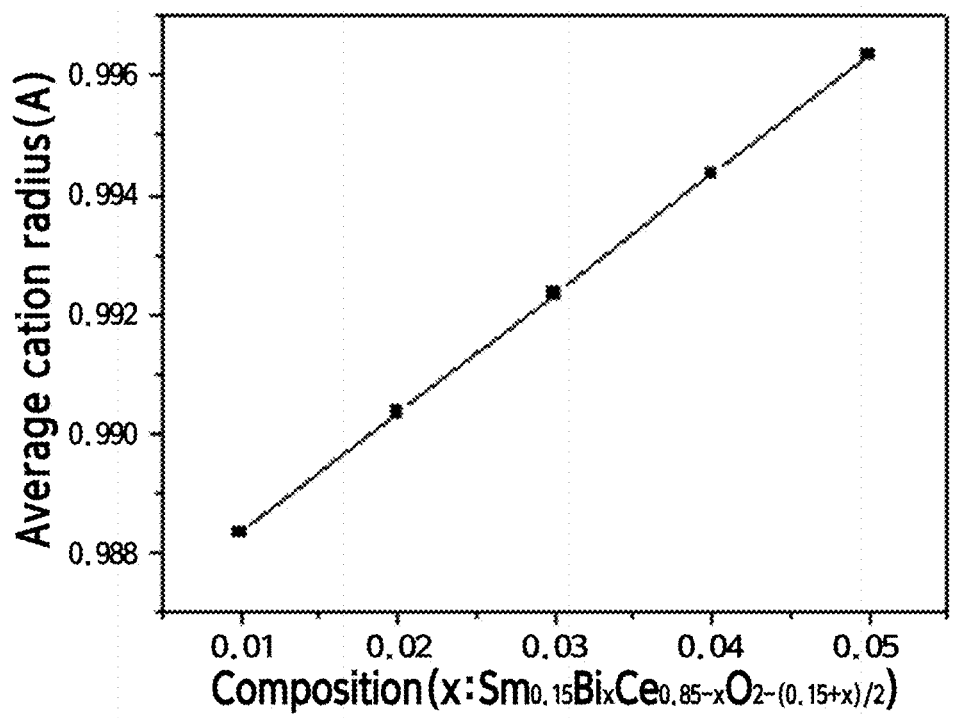
FIG. 6 is a graph illustrating the average cation radius of a Bi-doped SDC electrolyte.

In the case where some Sm ions are substituted with Bi to ensure the low-temperature sintering properties of the SDC electrolyte, that is, in the case of the Bi-doped SDC electrolyte ($Sm_{0.15}Bi_x Ce_{0.85-x}O_{2-(0.15+x)/2}$), the changes in the cation radius are shown in FIG. 6. As Bi, which has a relatively large ionic radius compared to Sm and Ce, is doped in a larger amount, the average cation radius is increased, which can be confirmed through calculation. When X, which indicates the amount of Bi, is 0.02 or more, the average cation radius is increased to 0.99 (Å) or more.

When Bi is additionally doped to ensure the low-temperature sintering properties of a conventional SDC electrolyte, the average cation radius is increased. This increase in the cationic radius may narrow the diffusion path (oxygen vacancies) of oxygen ions, thus impeding the conduction of oxygen ions.

Figure 7:
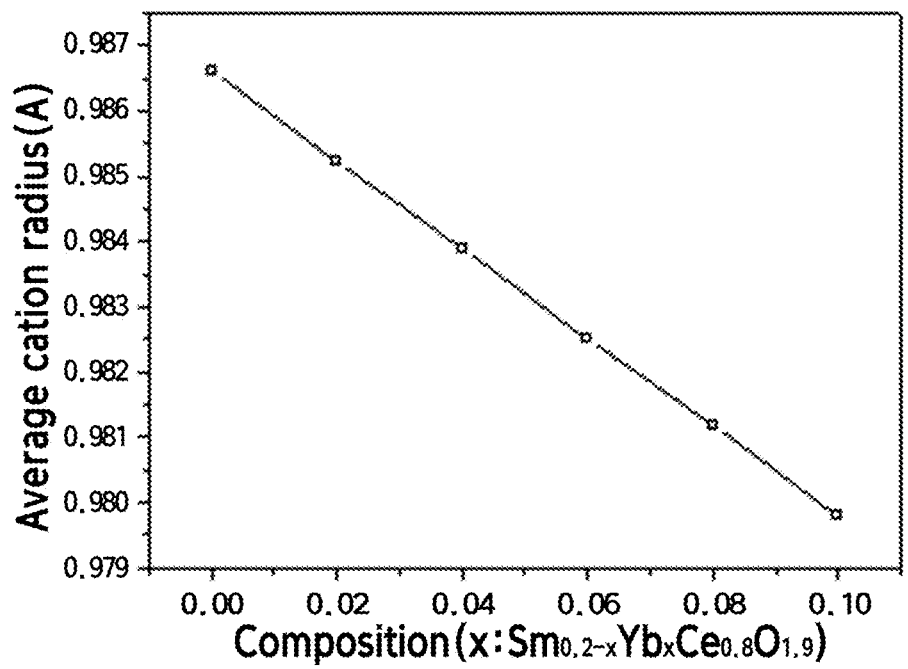
FIG. 7 is a graph illustrating the average cation radius of a Yb-doped SDC electrolyte.

On the other hand, changes in the cation radius of the Yb-doped SDC electrolyte ($Sm_{2-x}Yb_xCe_{0.8}O_{1.9}$) are shown in FIG. 7, in which some Sm ions are doped with Yb, which has a relatively small ionic radius, and the average cation radius is decreased with an increase in the doped amount thereof, which can be confirmed through calculation.

Hence, Yb, which has an ionic radius smaller than Sm, may be co-doped to suppress an increase in the average cation radius due to the doping with Bi, which has an ionic radius greater than Sm.

In addition, the present invention addresses a solid oxide fuel cell using the ceria electrolyte for low-temperature sintering as above, comprising an anode, a zirconia electrolyte, a ceria buffer layer, and a cathode.

The anode may comprise 30 to 50 wt % of a fluorite-type stabilized zirconia-based electrolyte and 50 to 70 wt % of NiO.

The zirconia electrolyte, which may be formed through co-sintering with the anode, may be a fluorite-type stabilized zirconia-based electrolyte, and may have the composition of Chemical Formula 3 below.

$(Re_2O_3)_x(ZrO_2)_{1-x}$  [Chemical Formula 3]

Re=at least one element selected from among Y, Sc, Yb, Ce, Gd, and Sm, $0.04 \leq X \leq 0.11$ The ceria buffer layer may be formed by coating the surface of the zirconia electrolyte with the ceria electrolyte for low-temperature sintering and then thermally treating it at 1100 to 1200° C.

The cathode may be formed through coating and thermal treatment on the surface of the ceria buffer layer, and may be composed of a mixed conductor having a perovskite ($ABO_3$)-based crystal structure with both electronic and oxygen ionic conductivities, and may have the composition of Chemical Formula 4 below.

$ABO_3$  [Chemical Formula 4]

A=at least one element selected from among La, Sm, Pr, Ba, Sr, and Ca

B=at least one element selected from among Fe, Co, Ni, and Cu

The content ratio of A and B is $0.95 \leq A/B \leq 1$

Also, the cathode may comprise a mixed conductor having a double-layer perovskite ($ABC_2O_{5+\delta}$)-based crystal structure with both electronic and oxygen ionic conductivities, and may have the composition of Chemical Formula 5 below.

$ABC_2O_{5+\delta}$  [Chemical Formula 5]

A=at least one element selected from among La, Sm, Nd, and Pr

B=at least one element selected from among Ba, Sr, and Ca

C=at least one element selected from among Co, Fe, Ni, Cu, and Mn

Also, the cathode may comprise 50 to 70 wt % of the mixed conductor having a perovskite ($ABO_3$)-based crystal structure or the mixed conductor having a double-layer perovskite ($ABC_2O_{5+\delta}$)-based crystal structure, and 30 to 50 wt % of a ceria-based electrolyte, in which the ceria-based electrolyte may have the composition of Chemical Formula 1 below.

$Gd_xYb_yBi_zCe_{1-x-y-z}O_{2-\delta}$  [Chemical Formula 1]

$0.05 \leq X \leq 0.15$, $0.005 \leq Y \leq 0.05$, $0.005 \leq Z \leq 0.05$, $0.06 \leq X+Y+Z \leq 0.25$, $\delta=(X+Y+Z)/2$ Also, the cathode may comprise 50 to 70 wt % of the mixed conductor having a perovskite ($ABO_3$)-based crystal structure or the mixed conductor having a double-layer perovskite ($ABC_2O_{5+\delta}$)-based crystal structure, and 30 to 50 wt % of a ceria-based electrolyte, in which the ceria-based electrolyte may have the composition of Chemical Formula 2 below.

$Sm_xYb_yBi_zCe_{1-x-y-z}O_{2-\delta}$  [Chemical Formula 2]

$0.1 \leq X \leq 0.17$, $0.005 \leq Y \leq 0.05$, $0.005 \leq Z \leq 0.05$, $0.11 \leq X+Y+Z \leq 0.27$, $\delta=(X+Y+Z)/2$ In this way, when the ceria-based electrolyte contained in the cathode of the solid oxide fuel cell has the same composition as the ceria-based electrolyte for the buffer layer, the thermal treatment time may be shortened, and a dense microstructure may be ensured even at low temperatures, thus improving the power characteristics of the unit cell.

Also, the cathode may comprise 50 to 70 wt % of the mixed conductor having a perovskite ($ABO_3$)-based crystal structure or the mixed conductor having a double-layer perovskite ($ABC_2O_{5+\delta}$)-based crystal structure, and 30 to 50 wt % of a ceria-based electrolyte, in which the ceria-based electrolyte may have the composition of Chemical Formula 6 below.

$Re_xCe_{1-x}O_{2-\delta}$  [Chemical Formula 6]

Re=at least one element selected from among Gd, Sm, Y, Nd, and Pr, $0.05 \leq X \leq 0.2$, $\delta=X/2$ The solid oxide fuel cell may have a unit cell configuration of, for example, an anode-supported cell (ASC), an electrolyte-supported cell (ESC), a metal-supported cell (MSC), or a segmented-type cell, and such a unit cell may be provided in a planar-type, tubular-type or flat-tube-type form.

The tubular-type single cell facilitates gas sealing and exhibits superior mechanical properties in terms of the structure thereof, and may thus be used to manufacture a large stack having power output ranging from tens of to hundreds of kW, but suffers from low power density per unit volume. The planar-type single cell has high power density per unit volume but is disadvantageous in terms of stack sealing, high reactivity between individual parts, and poor mechanical stability of the cell. This type is favorably employed in an auxiliary power unit (APU) having power output of ones of kW for transport and buildings of 10 kW or more, as well as home appliances of 1 kW or less requiring high power density. The tubular-type single cell is suitable for use in an anode-supported cell, a cathode-supported cell, or a segment-type cell, and the planner-type cell may be fabricated in the form of an anode-supported cell, an electrolyte-supported cell or a metal-supported cell. The flat-tube-type single cell may be currently utilized in home appliances based on an anode-supported cell or in power generation based on a segmented-type cell.

Below is a description of embodiments of the present invention, made through examples and test examples.

1. Evaluation of Bi Doping Effect in GDC Electrolyte 1-1. Composition Design

In order to evaluate the Bi doping effect, the compositions of pure GDC electrolytes ($Gd_xCe_{1-x}O_{2-x/2}$, X=0.1, 0.2) and Gd/Bi co-doped electrolytes ($Gd_{0.1}Bi_x Ce_{0.9-x}O_{2-\delta}$, X=0.025, 0.05, 0.075, 0.1, $\delta=(0.1+X)/2$) were designed as shown in Table 1 below.

TABLE 1

| Sample | Composition |
|---|---|
| 1: GDC-19 | $Gd_{0.1}Ce_{0.9}O_{1.95}$ |
| 2: GDC-28 | $Gd_{0.2}Ce_{0.8}O_{1.9}$ |
| 3: X = 0.025 | $Gd_{0.1}Bi_{0.025}Ce_{0.875}O_{1.9375}$ |
| 4: X = 0.05 | $Gd_{0.1}Bi_{0.05}Ce_{0.85}O_{1.925}$ |
| 5: X = 0.075 | $Gd_{0.1}Bi_{0.075}Ce_{0.825}O_{1.9125}$ |
| 6: X = 0.1 | $Gd_{0.1}Bi_{0.1}Ce_{0.8}O_{1.9}$ |

1-2. Preparation of Electrolyte Sample

In order to synthesize the electrolytes having the compositions of Table 1, $Gd_2O_3$, $Bi_2O_3$ and $CeO_2$ were used as raw materials, weighed so as to be adapted for the corresponding compositions, and then subjected to wet ball mill mixing using an ethanol solvent and zirconia balls having a diameter of 5 mm as milling media.

The wet-mixed electrolyte slurries were dried at 75° C., and then molded into planar- and disk-type powder compacts through uniaxial pressing.

Planar-type molded body: width 40 mm, length 40 mm, thickness 4 mm
Disk-type molded body: diameter 27 mm, thickness 3 mm The molded electrolyte samples were sintered at 1100 to 1400° C. for 5 hr in air.

1-3. Evaluation of Density and Shrinkage Rate of Sintered Body

Figure 8:
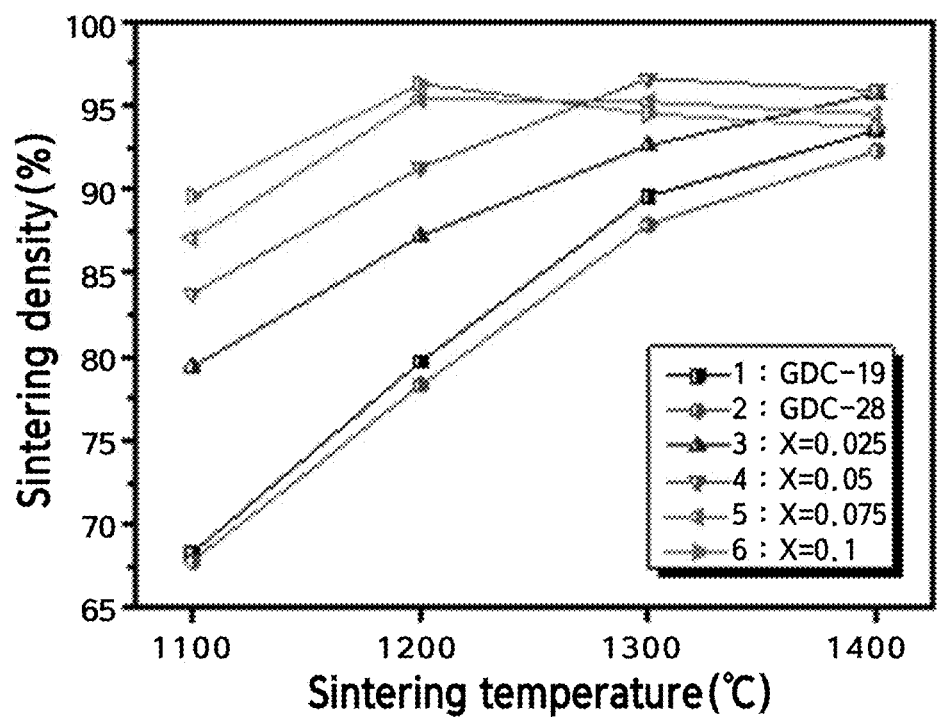
FIG. 8 is a graph illustrating the sintering density depending on an increase in the amount of doped Bi and an increase in the sintering temperature in the GDC electrolyte synthesized using a solid-state reaction process according to an embodiment of the present invention.

FIG. 8 illustrates the results of comparison of the sintering density of the GDC ($Gd_xCe_{1-x}O_{2-x/2}$, X=0.1, X=2), GDC-19 (X=0.1), and GDC-28 (X=0.2) electrolytes and the Gd/Bi co-doped electrolytes ($Gd_{0.1}Bi_x Ce_{0.9-x}O_{2-\delta}$, X=0.025, 0.05, 0.075, 0.1, $\delta=(0.1+X)/2$), sintered at 1100° C., 1200° C., 1300° C. and 1400° C. for 5 hr after synthesis through a solid-state reaction process using the compositions of Table 1.

As seen in FIG. 8, when sintering was performed at 1100° C. and 1200° C. which are the low sintering temperatures of interest, the sintering density was increased with an increase in the amount of Bi. Also, when Bi was used in an excessive amount (X=0.075, 0.1) under the condition of a high sintering temperature of 1300° C., the sintering density was lower than at 1200° C.

Figure 9:
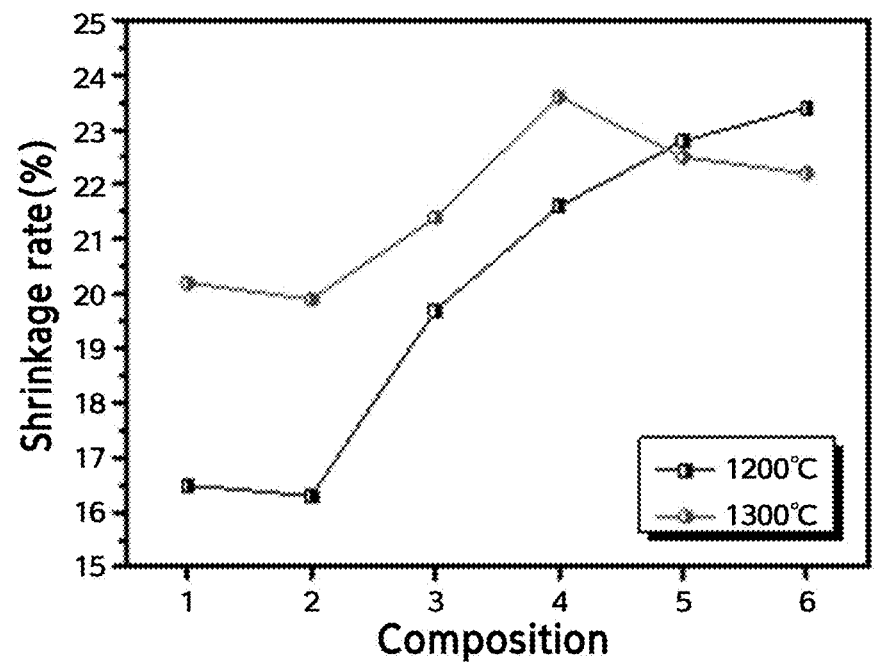
FIG. 9 is a graph illustrating the shrinkage rate depending on an increase in the amount of doped Bi and an increase in the sintering temperature in the GDC electrolyte synthesized using a solid-state reaction process according to an embodiment of the present invention.

FIG. 9 illustrates the results of calculation of the shrinkage rate of the electrolyte samples sintered at 1200° C. and 1300° C. corresponding to the results of FIG. 8, based on the following equation.

$$\text{Shrinkage rate} = \frac{(\text{diameter of molded body} - \text{diameter of sintered body})}{\text{diameter of molded body}} \times 100(\%)$$

As shown in FIG. 9, the electrolyte samples sintered at 1200° C. exhibited a shrinkage rate that increased with an increase in the amount of Bi. When the volume of the electrolyte was decreased in this way, the sintering density thereof was increased. On the other hand, the shrinkage rate of the electrolyte samples sintered at 1300° C. was increased with an increase in the amount of Bi and was maximized in the composition where X is 0.05. Then, as the amount of Bi was increased further, the shrinkage rate was somewhat decreased. This increase in the shrinkage rate was considered to be due to volume expansion caused by over-sintering, and the volume expansion resulted in lowered sintering density, as shown in FIG. 8.

Thus, the Bi doping effect significantly contributes to the low-temperature sintering of the GDC electrolyte, but the opposite effect may be shown when used in excess. Hence, the amount of Bi preferably falls in the range that does not exceed 5 mol % (X=0.05).

2. Evaluation of Bi/Yb Co-doping Effect in GDC Electrolyte 2-1. Design of Composition of Ceria Electrolyte In order to evaluate the Bi doping effect in the electrolyte in which Gd-doped ceria (GDC) is co-doped with Bi and Yb, the compositions of the chemical formulas shown in Table 2 below were designed.

TABLE 2

| Sample | Composition | |
|---|---|---|
| CE-1 | $(Gd_{0.9}Yb_{0.1})_{0.15}Ce_{0.85}O_{1.925}$ | $Gd_{0.135}Yb_{0.015}Ce_{0.85}O_{1.925}$ |
| CE-2 | $(Gd_{0.9}Yb_{0.1})_{0.15}Bi_{0.01}Ce_{0.84}O_{1.92}$ | $Gd_{0.135}Yb_{0.015}Bi_{0.01}Ce_{0.84}O_{1.92}$ |
| CE-3 | $(Gd_{0.9}Yb_{0.1})_{0.15}Bi_{0.02}Ce_{0.83}O_{1.915}$ | $Gd_{0.135}Yb_{0.015}Bi_{0.02}Ce_{0.83}O_{1.915}$ |
| CE-4 | $(Gd_{0.9}Yb_{0.1})_{0.15}Bi_{0.03}Ce_{0.82}O_{1.91}$ | $Gd_{0.135}Yb_{0.015}Bi_{0.03}Ce_{0.82}O_{1.91}$ |
| CE-5 | $(Gd_{0.9}Yb_{0.1})_{0.15}Bi_{0.04}Ce_{0.81}O_{1.905}$ | $Gd_{0.135}Yb_{0.015}Bi_{0.04}Ce_{0.81}O_{1.905}$ |
| CE-6 | $(Gd_{0.9}Yb_{0.1})_{0.15}Bi_{0.05}Ce_{0.8}O_{1.9}$ | $Gd_{0.135}Yb_{0.015}Bi_{0.05}Ce_{0.8}O_{1.9}$ |

FIG. 4 illustrates the results of calculation of the radii of all the cations of the electrolytes having the above compositions, which range from 0.98 to 0.99 (Å) and are controlled within the average cation size range of conventional commercially available GDC electrolytes.

2-2. Preparation of Electrolyte Sample

In order to synthesize the ceria-based electrolytes having the compositions of Table 2, $Gd_2O_3$, $Yb_2O_3$, $Bi_2O_3$ and $CeO_2$ were used as raw materials, weighed so as to be adapted for the corresponding compositions, and then subjected to wet ball mill mixing using an ethanol solvent and zirconia balls having a diameter of 5 mm as milling media.

The wet-mixed electrolyte slurries were dried at 75° C., and then molded into planar-type and disk-type powder compacts through uniaxial pressing.

Planar-type molded body: width 40 mm, length 40 mm, thickness 4 mm

Disk-type molded body: diameter 27 mm, thickness 3 mm

The molded electrolyte samples were sintered at 1200° C. for 5 hr in air. For comparative evaluation, an electrolyte sample was manufactured using a commercially available GDC ($Gd_{0.1}Ce_{0.9}O_{1.95}$, LSA grade, made by Japan Anan Kasei) powder.

2-3. Evaluation of Density and Shrinkage Rate of Sintered Body

Figure 10:
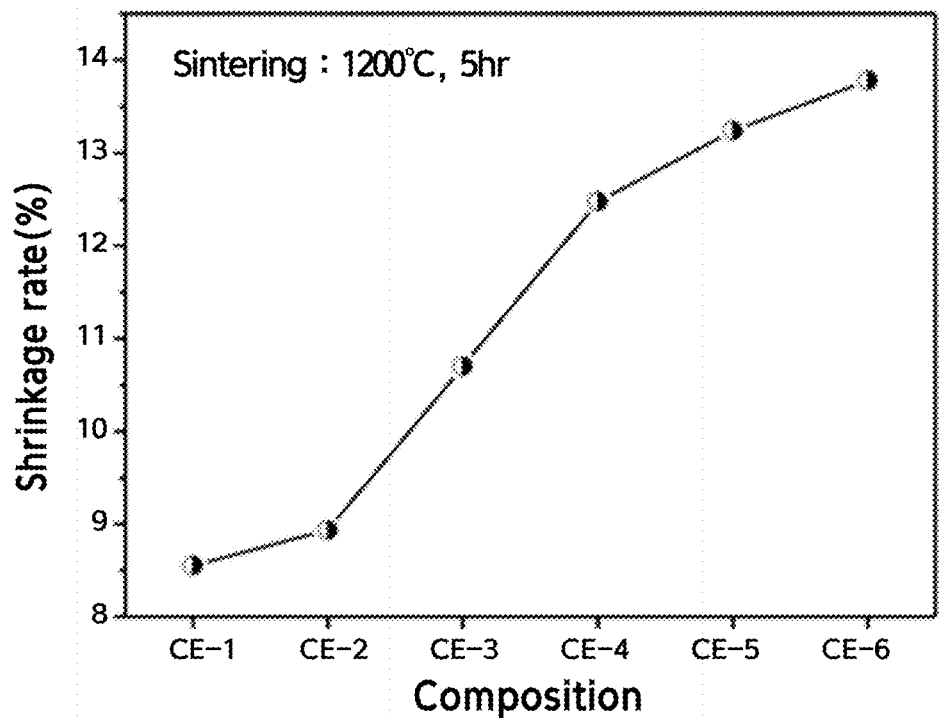
FIG. 10 is a graph illustrating the shrinkage rate in the Bi/Yb co-doped ceria electrolyte compositions sintered at 1200° C. for 5 hr after synthesis through a solid-state reaction process according to an embodiment of the present invention.

FIG. 10 illustrates the results of measurement of the shrinkage rate of the ceria electrolytes, which are co-doped with Yb and Bi shown in Table 2 and sintered at 1200° C. for 5 hr. These electrolytes exhibited the same shrinkage rate behavior as the electrolytes sintered at 1200° C. of FIG. 9. When Bi was used in an amount of 5 mol % or less, low-temperature sintering properties of interest could be ensured.

Particularly as shown in FIG. 10, in the CE-3 to CE-6 electrolyte samples, synthesized using a solid-state reaction process and sintered at 1200° C. for 5 hr and having a shrinkage rate of 10% or more, the use of Bi in an amount of 2 mol % or more is more preferable in terms of assuring low-temperature sintering properties.

2-4. Evaluation of Ionic Conductivity

Figure 11:
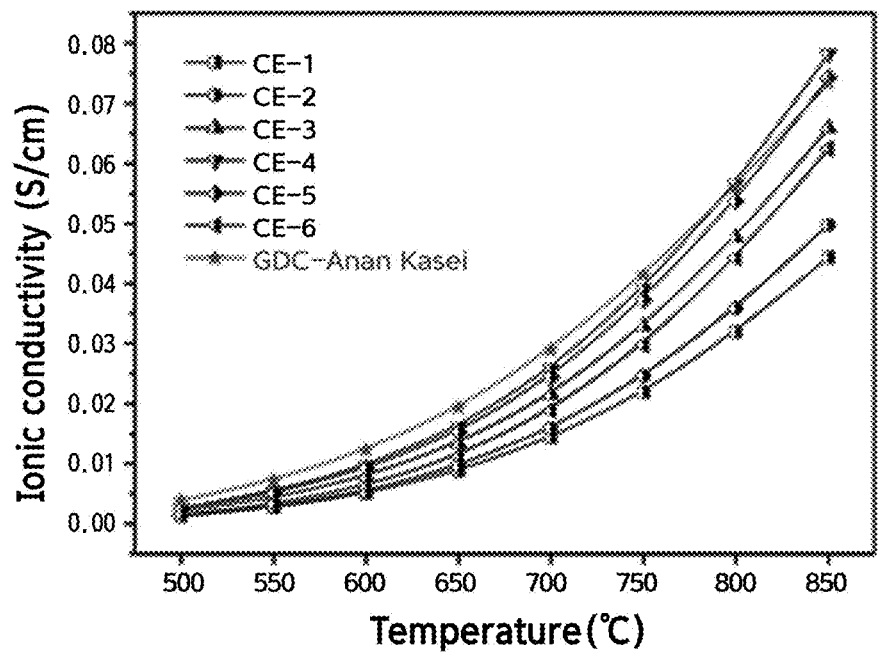
FIG. 11 is a graph illustrating the results of measurement of the ionic conductivity depending on the operating temperature using a DC four-terminal process in the ceria electrolyte compositions sintered at 1200° C. for 5 hr after synthesis through a solid-state reaction process according to an embodiment of the present invention.

FIG. 11 illustrates changes in ionic conductivity depending on temperature using a DC four-terminal process, in the CE-1 to CE-6 planar-type electrolyte samples, sintered at 1200° C. for 5 hr and processed in the shape of a bar having a width of 2 mm, a length of 20 mm and a height of 2 mm.

The ionic conductivity of the fluorite-type ceria- and zirconia-based electrolytes is typically known to increase as the concentration of oxygen vacancies and the sintering density are increased and as the ionic radius of the doped cation for forming oxygen vacancies becomes similar to the radius of the main lattice ion ($Ce^{4+}$ or $Zr^{4+}$).

As shown in FIG. 11, as the amount of doped Bi was increased from CE-1 to CE-4, the ionic conductivity was increased to approximate the ionic conductivity of the commercially available GDC electrolyte, which was sintered at 1400° C. This is considered to be because the sintering density and the oxygen vacancies increased with an increase in the amount of Bi. Bi is present in the form of $Bi^{3+}$ in the electrolyte lattice, as in $Gd^{3+}$ and $Yb^{3+}$, thus forming oxygen vacancies.

In particular, as shown in FIG. 11, the use of Bi in an amount of 2 to 4 mol % is more preferable, as in the CE-3 to CE-5 electrolyte samples having an ionic conductivity of 0.02 S/cm or more at 700 to 800° C., corresponding to the actual SOFC operating temperature.

2-5. Comparison with Commercially Available GDC Electrolyte

The CE-3 ceria electrolyte was synthesized using a wet co-precipitation process as a commercially available synthesis process, and water-soluble Gd nitrate ($Gd(NO_3)_3 \cdot 6H_2O$), Yb nitrate ($Yb(NO_3)_3 \cdot 6H_2O$), Bi nitrate ($Bi(NO_3)_3 \cdot 5H_2O$) and Ce nitrate ($Ce(NO_3)_3 \cdot 6H_2O$) were dissolved in pure water, thus preparing a 0.25 M mixed nitrate aqueous solution.

The mixed nitrate was continuously stirred, and aqueous ammonia ($NH_4OH$), as a precipitating agent, was added dropwise at a rate of 100 cc/min to the mixed nitrate using a metering pump to obtain a pH of 10, and the precipitated amorphous metal hydride was washed five times with water, and the electrolyte powder was calcined at 970° C. for 3 hr to grow and crystallize it, and then subjected to wet ball milling and drying, thus synthesizing a final CE-3 electrolyte powder.

The CE-3 powder synthesized through co-precipitation and the comparative LSA grade powder, made by Anan Kasei, were molded into planar-type and disk-type powder compacts through uniaxial pressing.

Planar-type molded body: width 40 mm, length 40 mm, thickness 4 mm

Disk-type molded body: diameter 27 mm, thickness 3 mm

The molded electrolyte samples were sintered at 1100 to 1400° C. for 5 hr in air.

Figure 12:
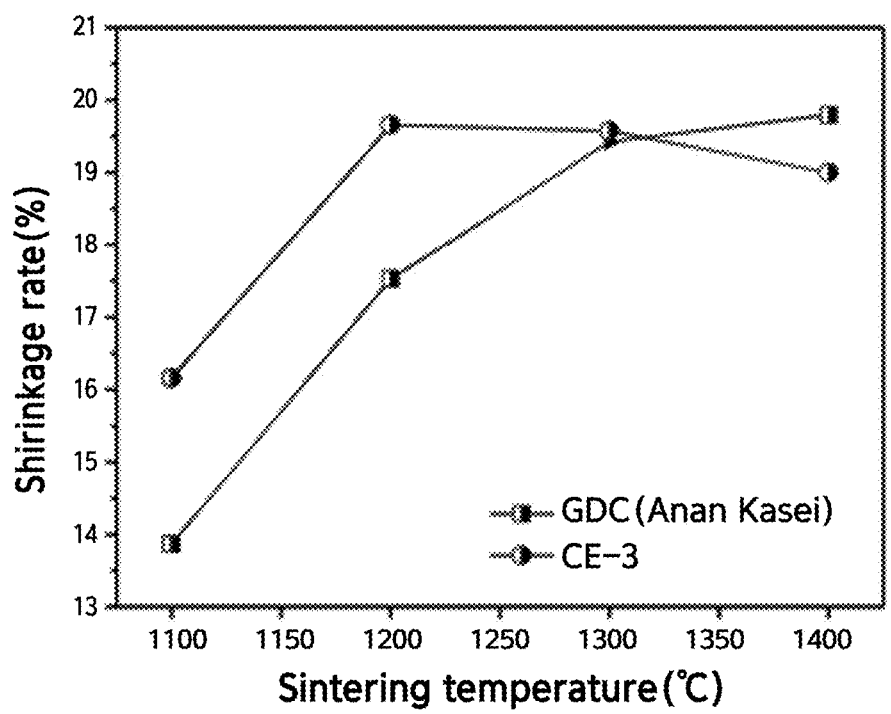
FIG. 12 is a graph illustrating the sintering shrinkage rate depending on the sintering temperature in the CE-3 electrolyte synthesized through co-precipitation according to an embodiment of the present invention and a commercially available GDC electrolyte, which are molded in the same manner.

FIG. 12 illustrates the shrinkage rate depending on the sintering temperature in the CE-3 electrolyte, synthesized through co-precipitation, and the comparative commercially available GDC electrolyte made by Anan Kasei, which are sintered at the same temperature. The CE-3 electrolyte exhibited the maximum shrinkage rate at 1200° C. but the shrinkage rate of the commercially available GDC increased continuously with an increase in the sintering temperature.

Figure 13:
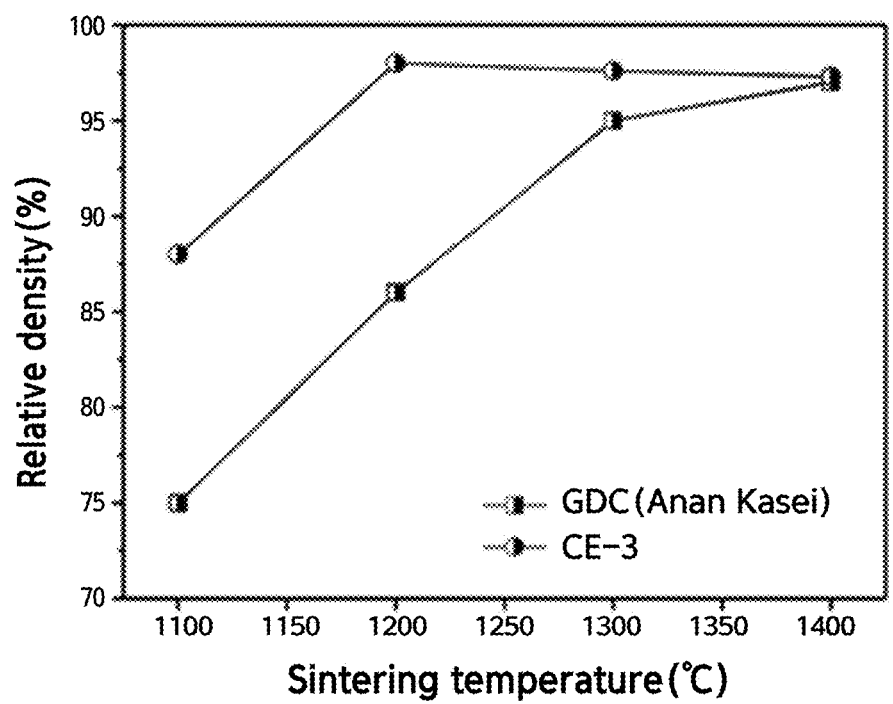
FIG. 13 is a graph illustrating the sintering density depending on the sintering temperature in the CE-3 electrolyte synthesized through co-precipitation according to an embodiment of the present invention and the commercially available GDC electrolyte, which are molded in the same manner.

FIG. 13 illustrates the sintering density depending on the sintering temperature in the CE-3 electrolyte synthesized through co-precipitation and the comparative commercially available GDC electrolyte made by Anan Kasei, which were sintered at the same temperature. These results show the same pattern as the results of evaluation of the shrinkage rate. Specifically, the shrinking and sintering of the CE-3 electrolyte were completed at 1200° C., and the growth of crystal grains and over-sintering thereof progressed with an increase in the sintering temperature, and the commercially available GDC was continuously shrunk and sintered up to 1400° C.

Figure 14:
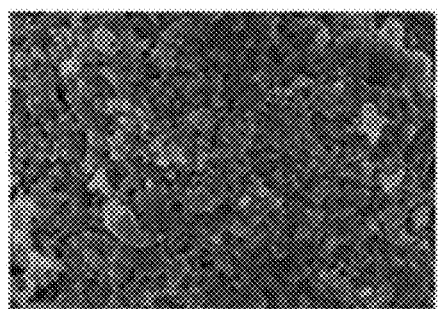
FIG. 14 illustrates scanning electron microscope (SEM) images of the microstructures depending on the sintering temperature in the CE-3 electrolyte synthesized through co-precipitation according to an embodiment of the present invention and the commercially available GDC electrolyte, which are molded in the same manner.

These results can be confirmed through the analysis of microstructures based on the SEM images of FIG. 14. The commercially available GDC simultaneously underwent densification and growth of crystal grains with an increase in the sintering temperature, whereas the densification of the CE-3 electrolyte was almost completed at 1100° C., and thus only the growth of crystal grains progressed with an increase in the sintering temperature.

Figure 15:
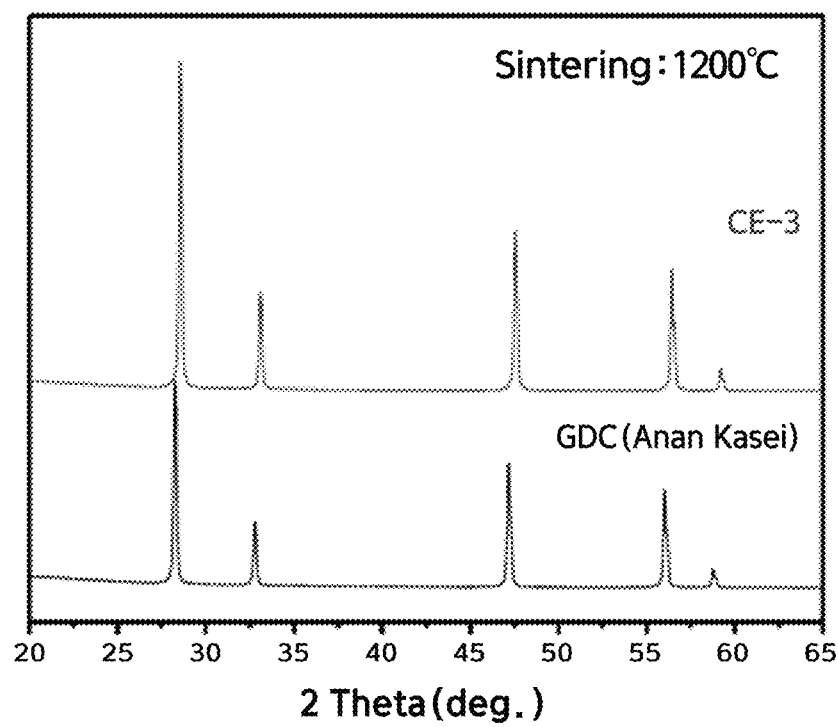
FIG. 15 is a graph illustrating the crystal structures, obtained through X-ray diffractive analysis, of the CE-3 electrolyte synthesized through co-precipitation according to an embodiment of the present invention and the commercially available GDC electrolyte, which are molded in the same manner and then sintered at 1200° C.

FIG. 15 illustrates the results of analysis of crystal structures, obtained using an X-ray diffractive analyzer, of the CE-3 electrolyte and the commercially available GDC electrolyte, which were sintered at 1200° C. These two samples exhibited the same pattern, but the CE-3 electrolyte showed high crystallinity in the relatively low sintering temperature range.

Figure 16:
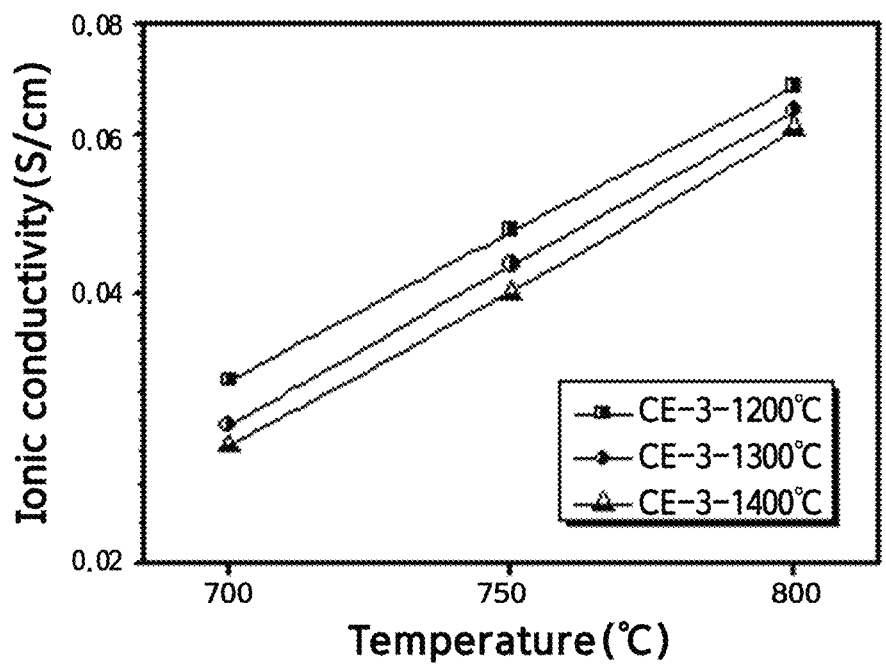
FIG. 16 is a graph illustrating the results of measurement of the ionic conductivity depending on the operating temperature using a DC four-terminal process in the CE-3 electrolyte, which is synthesized through co-precipitation and then sintered at 1200° C., 1300° C. and 1400° C. according to an embodiment of the present invention.

FIG. 16 illustrates the results of measurement of the ionic conductivity at 700 to 800° C., corresponding to the actual SOFC operating temperature, in the CE-3 electrolyte samples synthesized through co-precipitation and sintered at 1200° C., 1300° C. and 1400° C. The CE-3 electrolyte sample, sintered at 1200° C., at which the sintering density and the shrinkage rate were the highest, exhibited the maximum ionic conductivity at the same temperature. The ionic conductivity was decreased with an increase in the sintering temperature.

This is deemed to be because the sintering density was decreased due to over-sintering with an increase in the sintering temperature, and also because oxygen vacancies were reduced and pores were formed due to the Bi element, which was volatile at high temperature.

Figure 17:
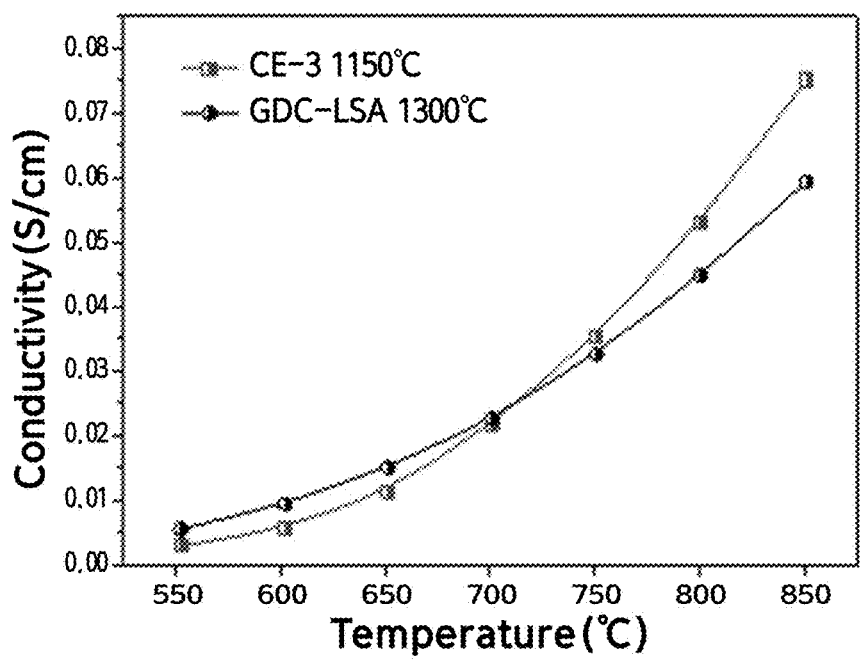
FIG. 17 is a graph illustrating the results of measurement of the ionic conductivity depending on the operating temperature using a DC four-terminal process in the CE-3 electrolyte synthesized through co-precipitation according to an embodiment of the present invention and the commercially available GDC electrolyte, which are sintered at 1150° C. and 1300° C., respectively.

FIG. 17 illustrates the ionic conductivity depending on the operating temperature in the CE-3 electrolyte, synthesized through co-precipitation and sintered at 1150° C., and the commercially available GDC electrolyte, sintered at 1300° C. As the operating temperature was increased above 700° C., the ionic conductivity of the CE-3 electrolyte was further increased.

2-6. Fabrication of Unit Cell

The power characteristics of a unit cell, manufactured by introducing the CE-3 electrolyte powder synthesized through co-precipitation as the buffer layer of the unit cell, were measured.

The unit cell was a type of electrolyte-supported cell (ESC), and was manufactured through a series of procedures including: molding of electrolyte support→sintering of electrolyte support→coating and thermal treatment of anode-→coating and thermal treatment of cathode.

A unit cell (ESC-1) including an LSM (Sr-doped LaMnO$_3$) cathode was manufactured through the above procedures, and a unit cell (ESC-2) including an LSCF (Sr- & Co-doped LaFeO$_3$) cathode was manufactured by additionally performing coating and thermal treatment of the CE-3 electrolyte, before the formation of the cathode.

Molding of Electrolyte Support:

A 10Sc1CeSZ (10 mol % Sc$_2$O$_3$+1 mol % CeO$_2$+89 mol % ZrO$_2$) electrolyte powder was subjected to uniaxial pressing, thus producing a disk-type molded body having a diameter of 25 mm and a thickness of 2 mm.

Sintering of Electrolyte Support:

The disk-type electrolyte molded body was sintered at 1450° C. for 5 hr in air, and processed into an electrolyte support having a diameter of 20 mm and a thickness of 300 μm.

Coating and Thermal Treatment of Anode:

The anode composite powder (NiO: 10Sc1CeSZ=57:43 wt %) was prepared into a printing paste, which was then applied on an anode having a diameter of 10 mm, and then thermally treated at 1250° C. for 3 hr in air.

Coating and Thermal Treatment of Buffer Layer:

As for the unit cell (ESC-2) including an LSCF cathode, the CE-electrolyte powder synthesized through co-precipitation was applied in the same manner as in the anode, and then thermally treated at 1150° C. for 3 hr in air.

Coating and Thermal Treatment of Cathode:

As the cathode materials for ESC-1 and ESC-2, the LSM (La$_{0.7}$Sr$_{0.3}$MnO$_3$) cathode and the LSCF (La$_{0.6}$SrOACo$_{0.2}$Fe$_{0.8}$O$_3$) cathode were used. For ESC-1, the cathode composite (LSM: 10Sc1CeSZ=60:40 wt %) and the LSM cathode were continuously coated and thermally treated at 1050° C. for 3 hr.

For ESC-2, the cathode composite (LSCF:CE-3=60:40 wt %) and the LSCF cathode were continuously coated and thermally treated at 1050° C. for 3 hr.

In the present example, the thermal treatment temperature of the cathode was set to 1050° C., but could vary in the range of 1000 to 1200° C. through control of the particle size of the cathode powder.

2-7. Evaluation of Power Characteristics of Unit Cell

Figure 18:
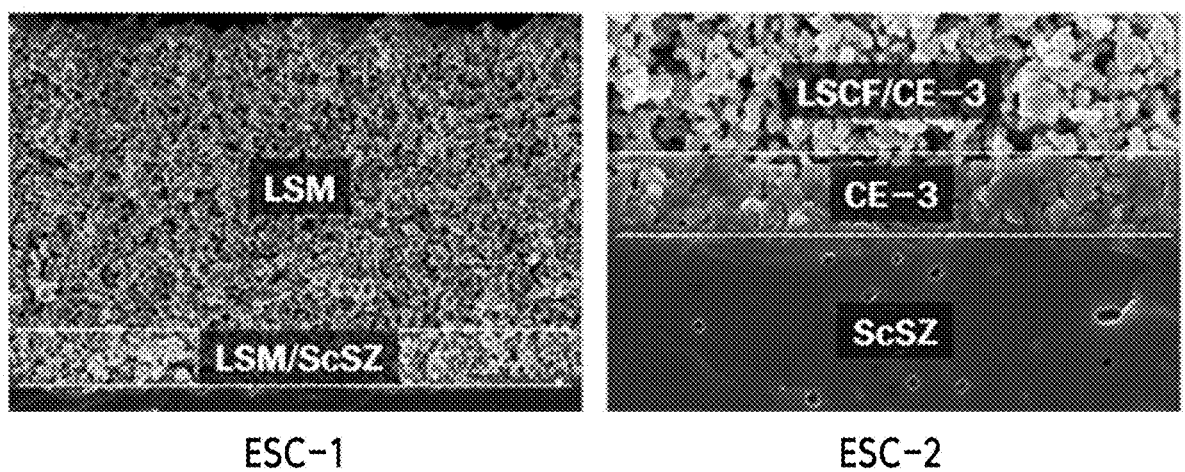
FIG. 18 illustrates SEM images of the microstructures of the fracture surfaces of the ESC-1 and ESC-2 unit cells fabricated according to an embodiment of the present invention.

FIG. 18 illustrates the results of analysis of microstructures of the fracture surfaces of ESC-1 and ESC-2, which show the microstructures of the dense electrolyte and the porous cathode. In particular, the CE-3 buffer layer for ESC-2 manifested superior interfacial adhesion to the electrolyte as well as high density, achieved through low-temperature thermal treatment at 1150° C.

Figure 19:
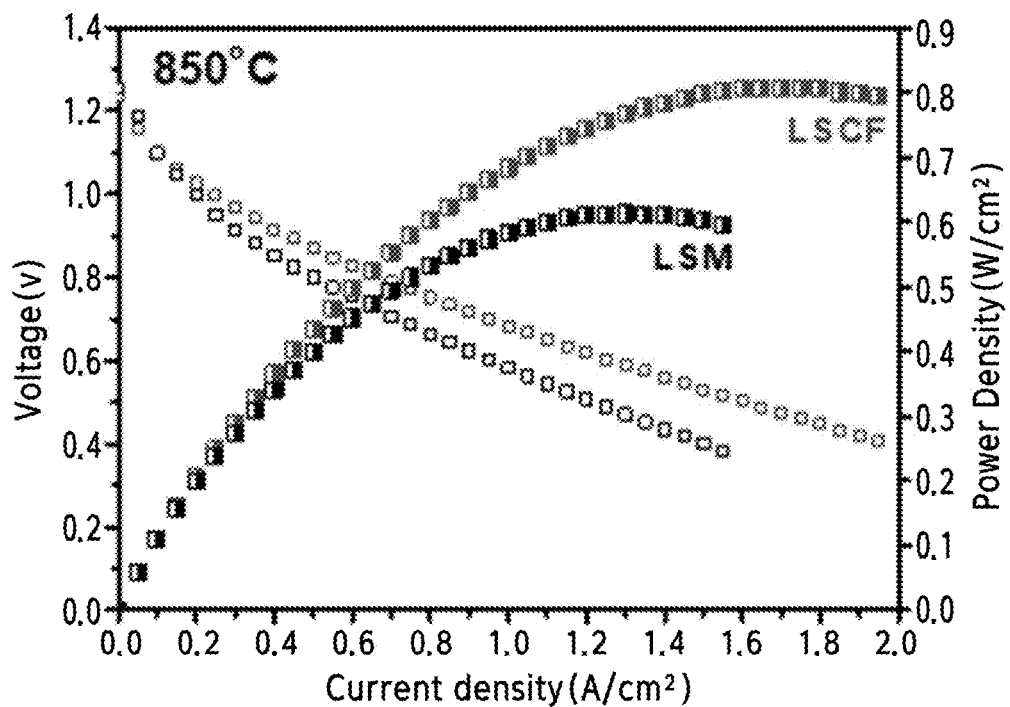
FIG. 19 is a graph illustrating the power density and voltage depending on the current density when the ESC-1 and ESC-2 unit cells fabricated according to an embodiment of the present invention are operated at 850° C.

The power characteristics of ESC-1 and ESC-2 were evaluated at 850° C., which is a typical ESC operating temperature, and air and hydrogen were supplied at 150 cc/min and 50 cc/min to the cathode and the anode, respectively. FIG. 19 illustrates the power characteristics of ESC-1 and ESC-2. The maximum power densities of ESC-1 and ESC-2 were respectively 0.61 W/cm$^2$ and 0.81 W/cm$^2$, and respectively 0.58 W/cm$^2$ and 0.68 W/cm$^2$ under the current density condition of 1 A/cm$^2$.

Consequently, ESC-2 including the LSCF MIEC cathode and the CE-3 buffer layer obtained through low-temperature thermal treatment exhibited the maximum power density that was increased by at least 30% at the same temperature, compared to ESC-1 including the LSM cathode.

3. Evaluation of Bi Doping Effect in SDC Electrolyte 3-1. Composition Design

In order to evaluate the Bi doping effect, the compositions of pure SDC electrolytes (Sm$_x$Ce$_{1-x}$O$_{2-x/2}$, X=0.1, 0.2) and Sm/Bi co-doped electrolytes (Sm$_{0.1}$Bi$_x$ Ce$_{0.9-x}$O$_{2-\delta}$, X=0.025, 0.05, 0.075, 0.1, δ=(0.1+X)/2, SBC) were designed as shown in Table 3 below.

TABLE 3

| Sample | Composition |
|---|---|
| 1: SDC-19 | Sm$_{0.1}$Ce$_{0.9}$O$_{1.95}$ |
| 2: SDC-28 | Sm$_{0.2}$Ce$_{0.8}$O$_{1.9}$ |
| 3: X = 0.025 | Sm$_{0.1}$Bi$_{0.025}$Ce$_{0.875}$O$_{1.9375}$ |
| 4: X = 0.05 | Sm$_{0.1}$Bi$_{0.05}$Ce$_{0.85}$O$_{1.925}$ |
| 5: X = 0.075 | Sm$_{0.1}$Bi$_{0.075}$Ce$_{0.825}$O$_{1.9125}$ |
| 6: X = 0.1 | Sm$_{0.1}$Bi$_{0.1}$Ce$_{0.8}$O$_{1.9}$ |

3-2. Preparation of Electrolyte Sample

In order to synthesize the electrolytes having the compositions of Table 3 through a solid-state reaction process, Sm$_2$O$_3$, Bi$_2$O$_3$ and CeO$_2$ were used as raw materials, weighed so as to be adapted for the corresponding compositions, and then subjected to wet ball mill mixing using an ethanol solvent and zirconia balls having a diameter of 5 mm as milling media.

The wet-mixed electrolyte slurries were dried and then molded into planar-type and disk-type powder compacts through uniaxial pressing.

Planar-type molded body: width 40 mm, length 40 mm, thickness 4 mm

Disk-type molded body: diameter 27 mm, thickness 3 mm

The molded electrolyte samples were sintered at 1100 to 1400° C. for 5 hr in air.

3-3. Evaluation of Shrinkage Rate, Porosity and Sintering Density of Sintered Body FIG. 20 illustrates the results of measurement of the sintering density in the SDC (Sm$_x$Ce$_{1-x}$O$_{2-x/2}$, X=0.1, X=2), SDC-19 (X=0.1) and SDC-28 (X=0.2) electrolytes and the Sm/Bi co-doped electrolytes (SBC:Sm$_{0.1}$Bi$_x$ Ce$_{0.9-x}$O$_{2-\delta}$, X=0.025, 0.05, 0.075, 0.1, δ=(0.1+X)/2), sintered at 1100° C., 1200° C., 1300° C. and 1400° C. for 5 hr after synthesis through a solid-state reaction process using the compositions of Table 3.

Figure 20:
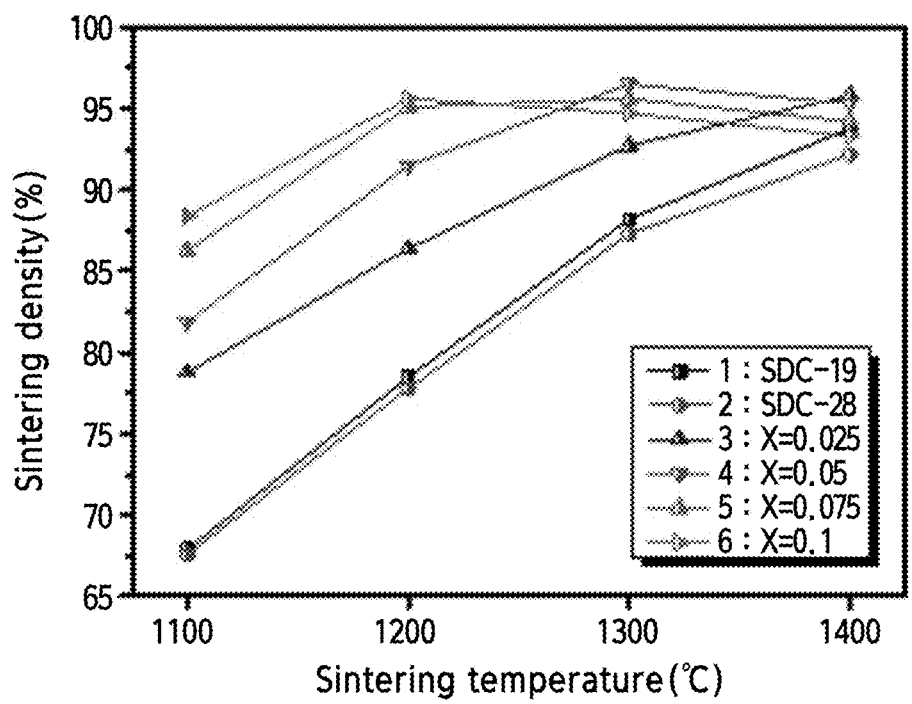
FIG. 20 is a graph illustrating the sintering density depending on an increase in the amount of doped Bi and an increase in the sintering temperature in the SBC electrolyte synthesized using a solid-state reaction process according to an embodiment of the present invention.

As shown in FIG. 20, when sintering was performed at 1100° C. and 1200° C., which are the low sintering temperatures of interest, the sintering density was increased with an increase in the amount of Bi. In the case where Bi was used in an excessive amount (X=0.075, 0.1) at a high sintering temperature of 1300° C., the sintering density was decreased compared to when the sintering temperature was 1200° C., or the effect thereof was not further improved.

Figure 21:
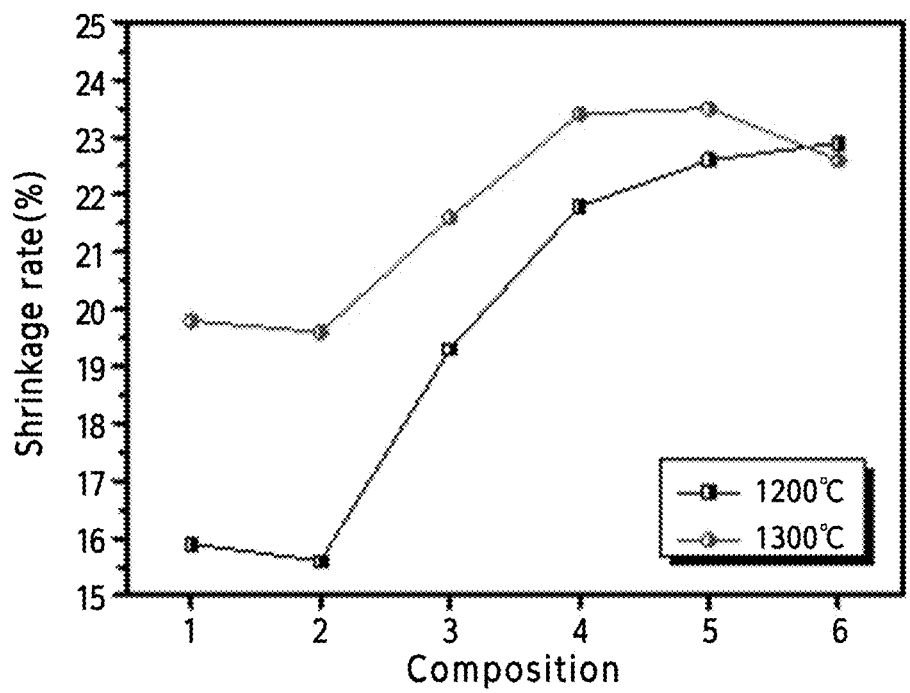
FIG. 21 is a graph illustrating the shrinkage rate depending on an increase in the amount of doped Bi and an increase in the sintering temperature in the SBC electrolyte synthesized using a solid-state reaction process according to an embodiment of the present invention.

FIG. 21 illustrates the results of calculation of the shrinkage rate in the electrolyte samples sintered at 1200° C. and 1300° C. corresponding to the results of FIG. 20, using the following equation.

$$\text{Shrinkage rate} = \frac{(\text{diameter of molded body} - \text{diameter of sintered body})}{\text{diameter of molded body}} \times 100(\%)$$

As illustrated in FIG. 21, the electrolyte samples sintered at 1200° C. were increased in shrinkage rate with an increase in the amount of Bi. As the volume of the electrolyte was reduced, the sintering density of the electrolyte was increased. On the other hand, the shrinkage rate of the electrolyte samples sintered at 1300° C. was increased with an increase in the amount of Bi and was maximized in the compositions where X is 0.05 and 0.075. Also, as the amount of Bi was increased further, the shrinkage rate was somewhat decreased. It is considered that this increase in the shrinkage rate resulted from volume expansion due to over-sintering, and that the sintering density was decreased owing to the volume expansion, as shown in FIG. 20.

Therefore, the Bi doping effect significantly contributes to the low-temperature sintering of the SDC electrolyte. However, when Bi is used in an excessive amount, the opposite effect is shown. Hence, the amount of Bi preferably falls in the range that does not exceed 5 mol % (X=0.05).

4. Evaluation of Bi/Yb Co-doping Effect in SDC Electrolyte 4-1. Design of Composition of Ceria Electrolyte In order to evaluate the Bi doping effect in a typical SDC electrolyte and a Bi/Yb co-doped electrolyte (SYBC), the compositions represented by chemical formulas of Table 4 below were designed.

TABLE 4

| Sample | Composition |
| --- | --- |
| SDC | $Sm_{0.2}Ce_{0.8}O_{1.9}$ |
| SYBC | $Sm_{0.16}Yb_{0.02}Bi_{0.02}Ce_{0.8}O_{1.9}$ |

4-2. Preparation of Electrolyte Sample

The SDC and SYBC having the compositions of Table 4 were manufactured by dissolving a metal nitrate material at the corresponding composition ratio in pure water and then dissolving citric acid therein to give a mixed aqueous solution, which was then stirred and heated at 250° C., thus obtaining a concentrated solution.

The concentrated solution was burned at 500° C., and the burned SDC and SYBC powders were subjected to wet ball milling, dispersed, dried, thermally treated at 1000° C., and then again subjected to wet ball milling.

The finally synthesized SDC and SYBC powders were molded into planar-type and disk-type powder compacts through uniaxial pressing.

Planar-type molded body: width 40 mm, length 40 mm, and thickness 4 mm

Disk-type molded body: diameter 27 mm, thickness 3 mm

The molded electrolyte samples were sintered at 1100 to 1400° C. for 3 hr in air.

Figure 22:
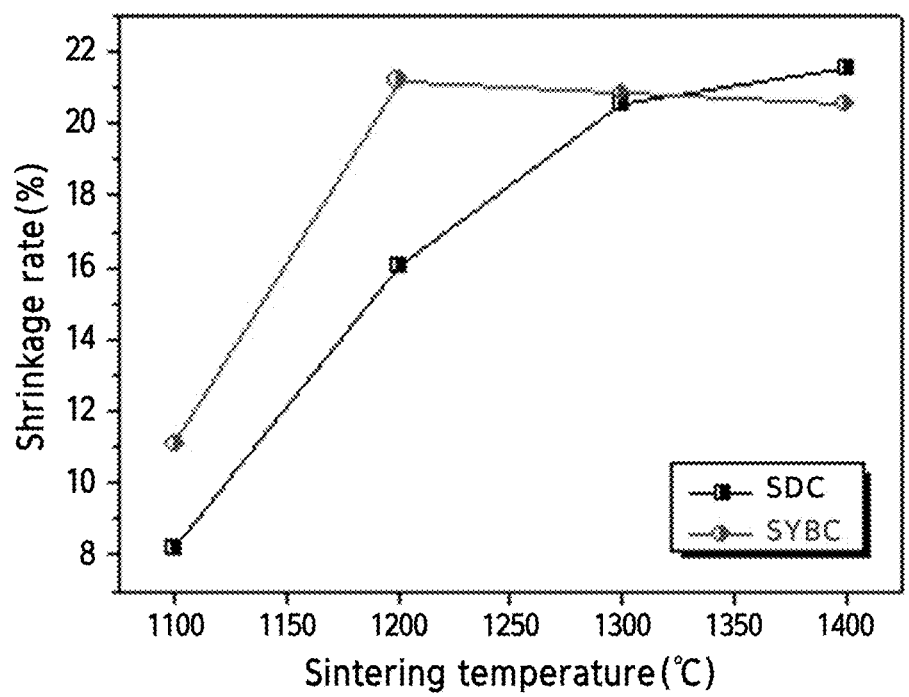
FIG. 22 is a graph illustrating the sintering shrinkage rate depending on the sintering temperature in the typical SDC electrolyte and the SYBC electrolyte, which are synthesized using a citrate process and then molded in the same manner according to an embodiment of the present invention.

4-3. Evaluation of Shrinkage Rate, Porosity and Sintering Density of Sintered Body FIG. 22 illustrates the results of measurement of the shrinkage rate in the SDC and SYBC sintered bodies, synthesized through a citrate process and sintered at 1100 to 1400° C. for 3 hr in air.

Based on the results of measurement of shrinkage rate, the SDC electrolyte exhibited typical ceramic sintering behavior, in which the shrinkage rate is gradually decreased with an increase in the sintering temperature, whereas the SYBC electrolyte manifested the maximum shrinkage rate at a sintering temperature of 1200° C., and was reduced in the shrinkage rate due to over-sintering at 1300° C. or higher.

Figure 23:
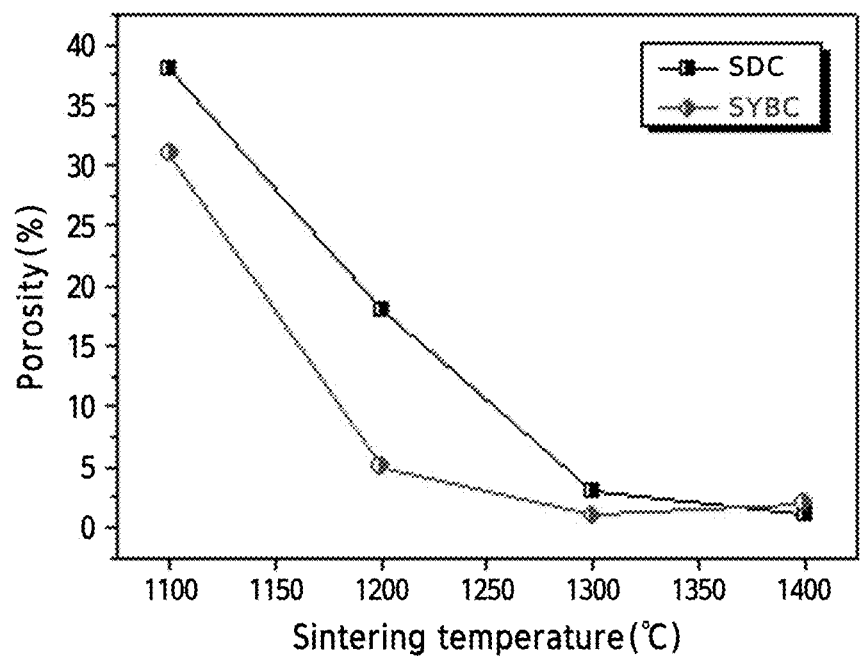
FIG. 23 is a graph illustrating the porosity depending on the sintering temperature in the typical SDC electrolyte and the SYBC electrolyte, which are synthesized using a citrate process and then molded in the same manner according to an embodiment of the present invention.
Figure 24:
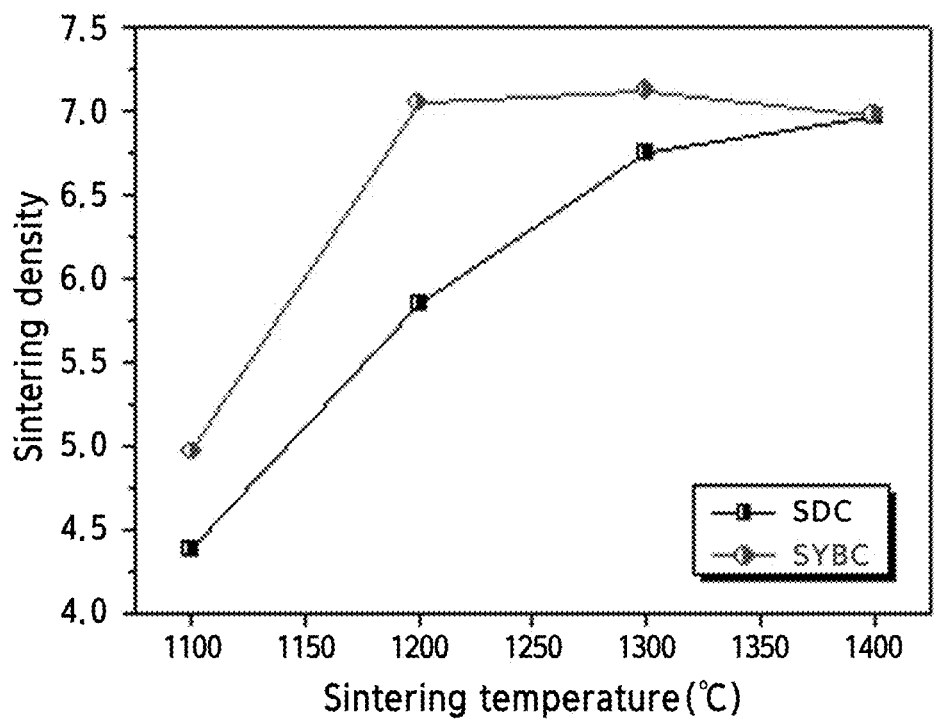
FIG. 24 is a graph illustrating the sintering density depending on the sintering temperature in the typical SDC electrolyte and the SYBC electrolyte, which are synthesized using a citrate process and then molded in the same manner according to an embodiment of the present invention.

FIGS. 23 and 24 illustrate the results of evaluation of the porosity and sintering density using the Archimedes principle in the SDC and SYBC sintered bodies, prepared through a citrate process and sintered at 1100 to 1400° C. for 3 hr in air.

In the evaluation of porosity, the porosity of the SDC electrolyte was drastically decreased due to the densification through sintering in the temperature range of 1100 to 1300° C., and was slightly decreased in the high-temperature range of 1300 to 1400° C. The porosity of the SYBC electrolyte was considerably reduced due to the densification through sintering in the low-temperature range of 1100 to 1200° C., was slightly decreased in the middle-temperature range of 1200 to 1300° C., and was increased due to over-sintering in the high-temperature range of 1300 to 1400° C. Particularly the SYBC electrolyte had a porosity of 10% or less after sintering at 1200° C. for 3 hr, and thus could sufficiently ensure the low-temperature sintering properties of interest.

The sintering density of SDC and SYBC exhibited results similar to the shrinkage rate behavior thereof and opposite to the porosity behavior thereof. Consequently, the sintering density of the SYBC electrolyte sintered at 1200° C. was equivalent to that of the SDC electrolyte sintered at 1400° C., thus showing excellent low-temperature sintering properties of SYBC.

4-4. Evaluation of Microstructure of Sintered Body

Figures 25, 26:
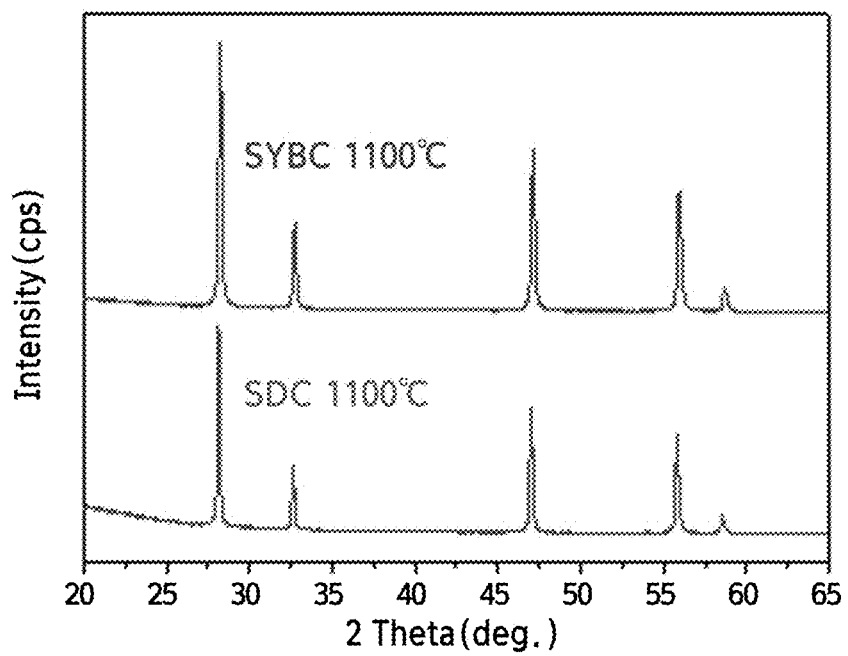
FIG. 25 illustrates SEM images of the microstructures depending on the sintering temperature in the typical SDC electrolyte and the SYBC electrolyte, which are synthesized using a citrate process and then molded in the same manner according to an embodiment of the present invention.
FIG. 26 is a graph illustrating the crystal structures, obtained through X-ray diffractive analysis, of the typical SDC electrolyte and the SYBC electrolyte, which are synthesized using a citrate process, molded in the same manner and then sintered at 1100° C. according to an embodiment of the present invention.

FIG. 25 illustrates the results of SEM analysis of microstructures of the SDC and SYBC sintered bodies, sintered at 1100° C. and 1300° C. The SDC sintered at 1100° C. was not densified, but the SYBC electrolyte sintered at the same temperature was considerably densified. The densification and the growth of crystal grains in the SDC sintered at 1300° C. progressed, and most crystal grains had a small size of 0.5 µm or less, whereas the growth of crystal grains sufficiently progressed in the SYBC electrolyte sintered at the same temperature, thus forming coarse crystal grains having a size of about 1 µm.

FIG. 26 is a graph illustrating the crystal structures, obtained through X-ray diffractive analysis, of the typical SDC electrolyte and the SYBC electrolyte, which were molded in the same manner and sintered at 1100° C., according to an embodiment of the present invention. The crystal structures of SDC and SYBC sintered bodies sintered at 1100° C. were analyzed, and as shown in FIG. 26, both electrolytes manifested the fluorite-type crystal structure without any impurities or secondary phase, and the crystallinity of the densified SYBC was relatively high.

4-5. Evaluation of Ionic Conductivity

In order to evaluate the ionic conductivity of the SDC and SYBC electrolytes prepared through a citrate process and sintered in the corresponding temperature range, the planar-type electrolyte samples were processed in the form of a bar shape having a width of 2 mm, a length of 20 mm and a height of 2 mm, and then changes in ionic conductivity thereof were measured at different temperatures using a DC four-terminal process.

The ionic conductivity of the fluorite-type ceria- and zirconia-based electrolytes is generally known to increase as the concentration of oxygen vacancies and the sintering density are increased and as the radius of the doped cation for forming oxygen vacancies becomes similar to the radius of the main lattice ion ($Ce^{4+}$ or $Zr^{4+}$).

Figure 27:
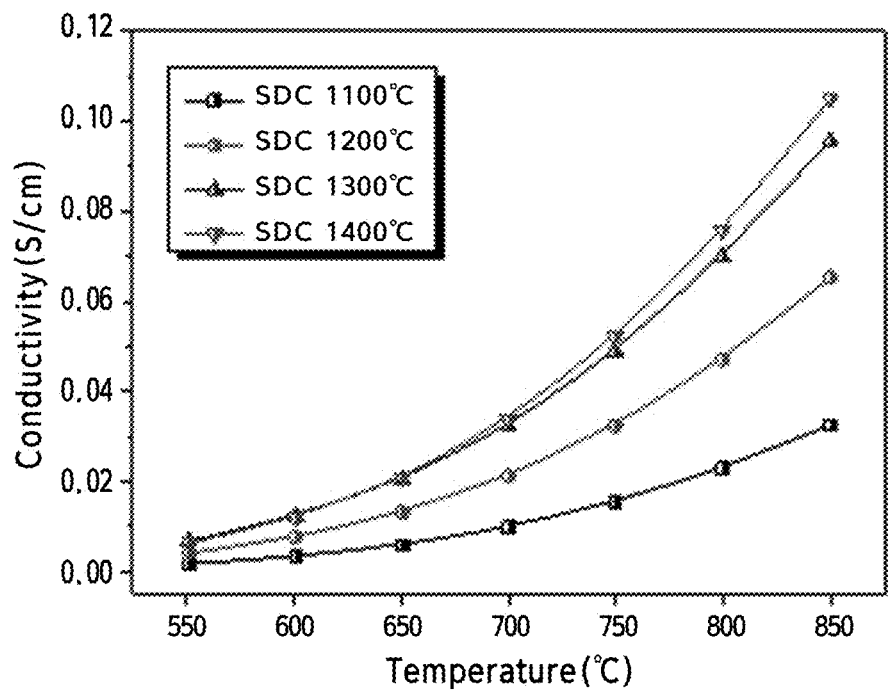
FIG. 27 is a graph illustrating the results of measurement of the ionic conductivity depending on the operating temperature using a DC four-terminal process in the typical SDC electrolyte, which is synthesized using a citrate process and then sintered at 1100 to 1400° C. according to an embodiment of the present invention.

FIG. 27 is a graph illustrating the results of measurement of the ionic conductivity at different operating temperatures using a DC four-terminal process in the typical SDC electrolyte sintered at 1100 to 1400° C. according to the embodiment of the invention. The ionic conductivity of the SDC electrolyte is directly correlated with the sintering density. As the sintering temperature increases, the increase in sintering density is almost the same as the increase in ionic conductivity.

Figure 28:
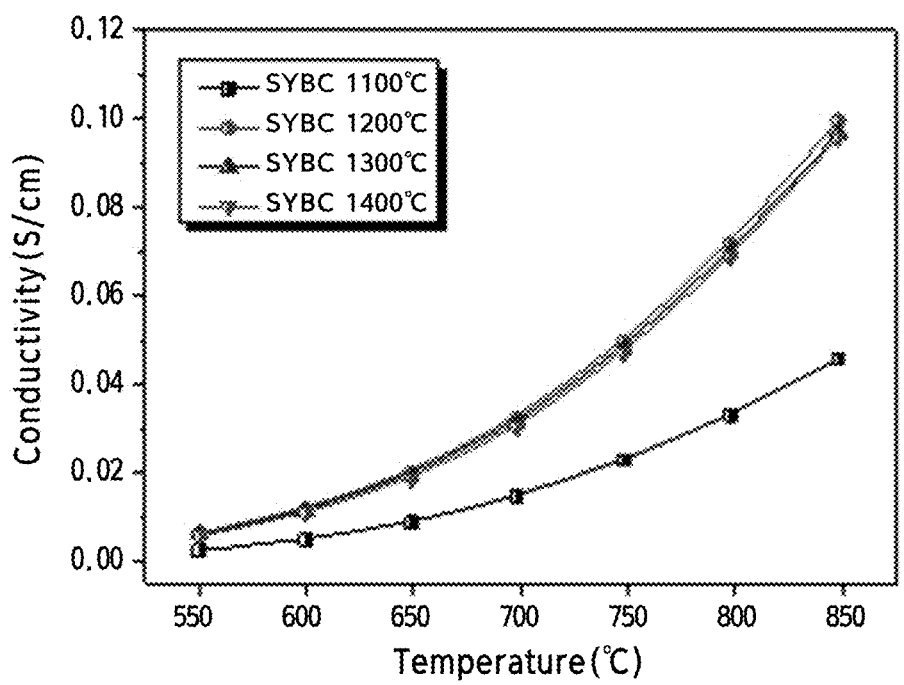
FIG. 28 is a graph illustrating the results of measurement of the ionic conductivity depending on the operating temperature using a DC four-terminal process in the SYBC electrolyte, which is synthesized using a citrate process and then sintered at 1100 to 1400° C. according to an embodiment of the present invention.

FIG. 28 is a graph illustrating the results of measurement of the ionic conductivity at different operating temperatures using a DC four-terminal process in the SYBC electrolyte sintered at 1100 to 1400° C. according to the embodiment of the invention. As for the SYBC electrolyte having low-temperature sintering properties, all of the electrolytes, other than the electrolyte sintered at 1100° C., exhibited equivalent ionic conductivity results, whereby the ionic conductivity under low-temperature sintering conditions was equivalent to that of the SDC sintered at high temperatures.

Figure 29:
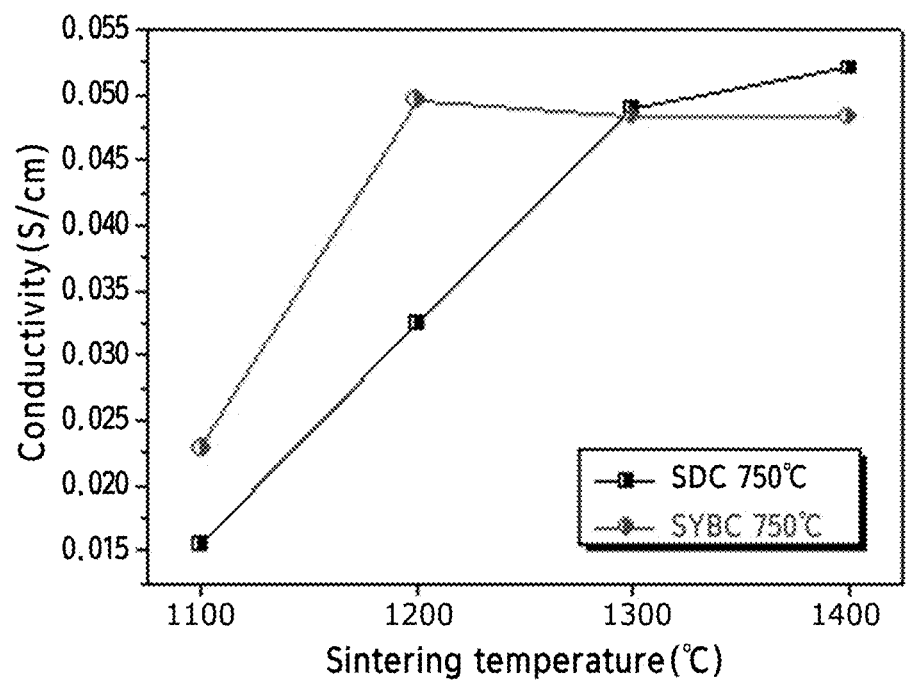
FIG. 29 is a graph illustrating the results of measurement of the ionic conductivity at 750° C. in the SDC and SYBC electrolytes, which are synthesized using a citrate process and then sintered at 1100 to 1400° C. according to an embodiment of the present invention.

FIG. 29 is a graph illustrating the results of measurement of the ionic conductivity at 750° C. in the SDC and SYBC electrolytes sintered at 1100 to 1400° C. according to the embodiment of the invention, and these results show the same pattern as the shrinkage rate results of FIG. 22.

Figure 30:
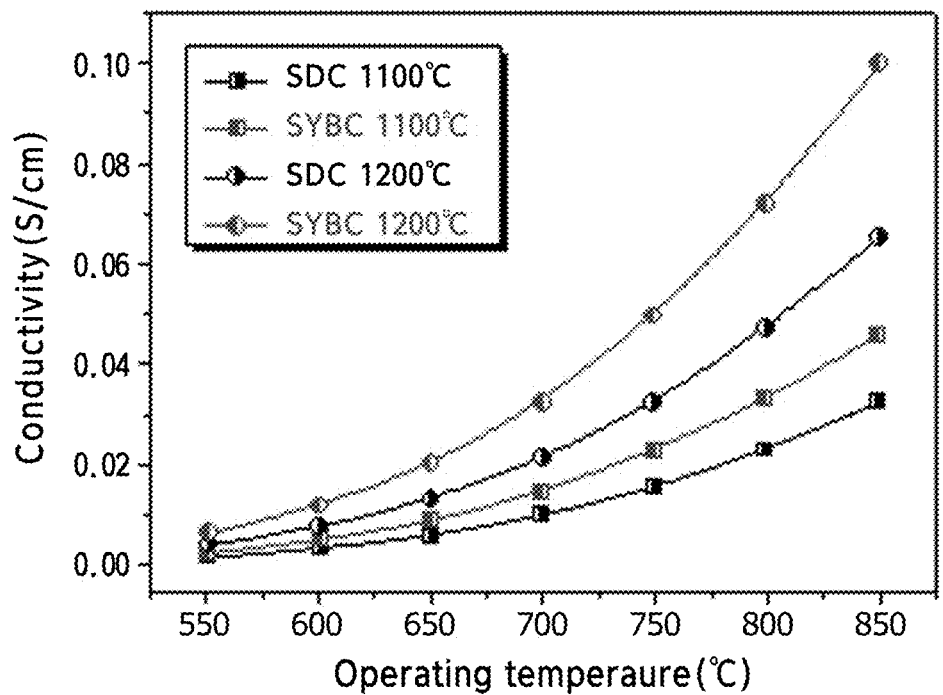
FIG. 30 is a graph illustrating the ionic conductivity of the SDC and SYBC electrolytes, which are synthesized using a citrate process and sintered at 1100 and 1200° C., which are considered low sintering temperatures, according to an embodiment of the present invention.

FIG. 30 is a graph illustrating the ionic conductivity of the SDC and SYBC electrolytes sintered at 1100° C. and 1200° C., which are regarded as low sintering temperatures according to the embodiment of the invention. The ionic conductivity of SYBC is remarkably high thanks to the low-temperature sintering properties thereof, and thus SYBC is usable as a buffer layer through low-temperature sintering.

Consequently, the oxygen vacancies ($O_{2-\delta}$, $\delta$=0.1) of SDC and SYBC are the same as each other, and the high ionic conductivity of SYBC through low-temperature sintering was deemed to result from doping with Bi and Yb, which show the same pattern as the results of shrinkage rate of FIG. 22.

In particular, the SYBC electrolyte sintered at 1100° C. and 1200° C., which are considered low sintering temperatures, as shown in FIG. 30, exhibited an ionic conductivity of 0.02 S/cm or higher at 750° C., corresponding to the actual SOFC operating temperature, thus sufficiently ensuring the low-temperature sintering properties of interest.

4-6. Fabrication of Unit Cell

The power characteristics of a unit cell including the SYBC electrolyte as the buffer layer of the unit cell were analyzed.

The single cell was fabricated through a series of procedures, including: uniaxial pressing of electrolyte support→sintering of electrolyte support (1450° C., 5 hr)→coating and thermal treatment of anode (1300° C., 3 hr)→coating and thermal treatment of SYBC buffer layer (1200° C., 3 hr)→coating and thermal treatment of LSCF cathode (1050° C., 3 hr).

Molding of electrolyte support: A 10Sc1CeSZ (10 mol % $Sc_2O_3$ & 1 mol % $CeO_2$ stabilized $ZrO_2$) electrolyte powder was subjected to uniaxial pressing using a mold having a diameter of 27 mm.

Sintering of electrolyte support: The 27 mm disk-type electrolyte molded body, obtained by uniaxial pressing, was sintered at 1450° C. for 5 hr in air and then mechanically processed, thus producing an electrolyte support having a diameter of 20 mm and a thickness of 300 μm.

Coating and thermal treatment of anode: A composite powder (NiO: 10Sc1CeSZ=58:42 wt %) having a specific surface area (BET) of 8 to 10 $m^2$/g was prepared into a paste, which was then applied on an anode having a diameter of 8 mm through screen printing, and then thermally treated at 1300° C. for 3 hr in air.

Coating and thermal treatment of SYBC buffer layer: A SYBC electrolyte powder was prepared into a paste, which was then applied on SYBC having a diameter of 8 mm, and then thermally treated at 1200° C. for 3 hr in air.

Coating and thermal treatment of cathode: Each of a fine composite powder (LSCF:SYBC=60:40 wt %) having a specific surface area (BET) of 8 to 10 $m^2$/g and a coarse LSCF powder having a specific surface area (BET) of 4 to 6 $m^2$/g was prepared into a paste, which was then applied on the CFL (cathode functional layer) and the CCC (cathode current collector) cathode having a diameter of 8 mm through continuous screen printing, and then thermally treated at 1050° C. for 3 hr in air.

For comparative evaluation, a single cell comprising LSM cathode (CFL=LSM (60): 10Sc1CeSZ (40), CCC=LSM), without the SYBC buffer layer, was manufactured in the same manner as above.

4-7. Evaluation of Power Characteristics of Unit Cell

Figure 31:
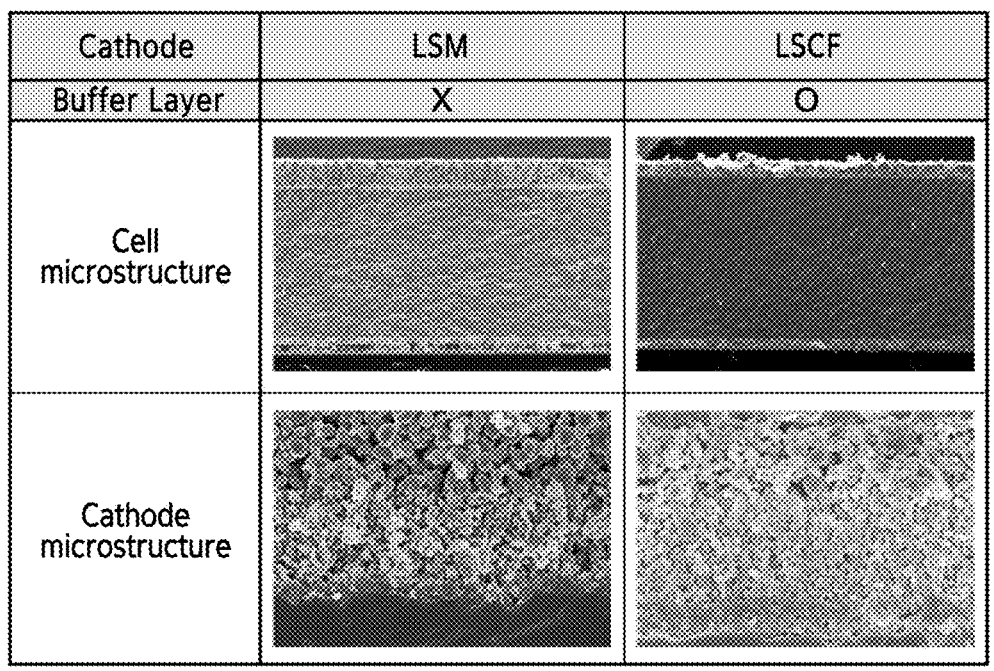
FIG. 31 illustrates images of the microstructures of ESC including the LSM cathode and ESC including the LSCF cathode and the SYBC electrolyte as the buffer layer, according to the present invention.

FIG. 31 illustrates the microstructures of the ESC including the LSM cathode and the ESC including the LSCF cathode and the SYBC electrolyte as the buffer layer, according to the present invention. Both kinds of single cells had an electrolyte thickness of 300 μm.

Figure 32:
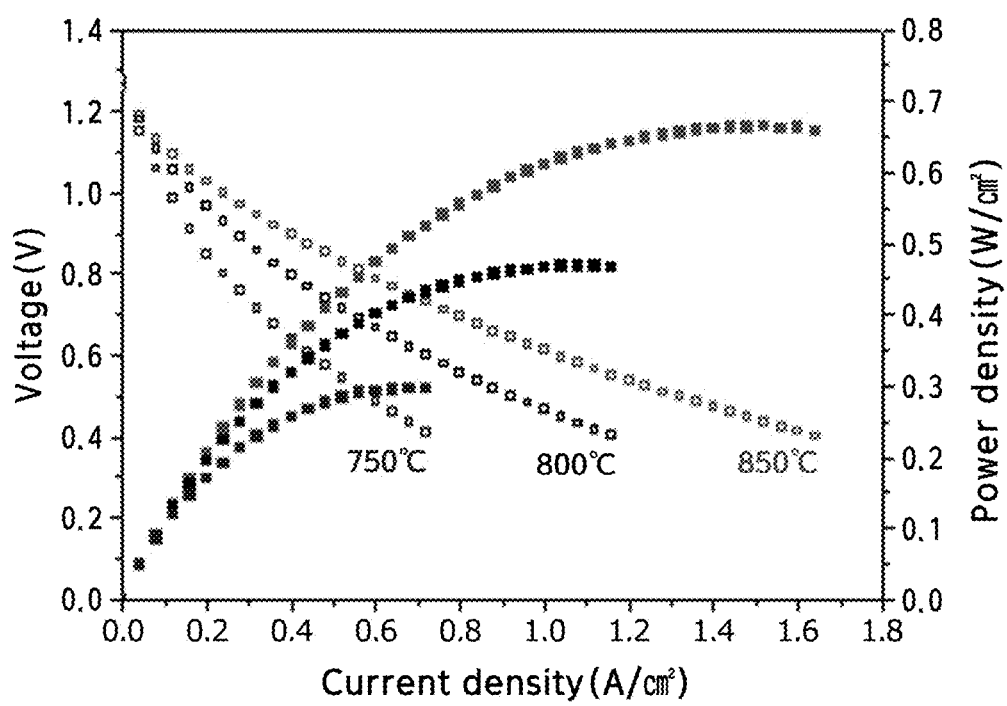
FIG. 32 is a graph illustrating the power density of ESC including the LSM cathode, operated at 750° C., 800° C. and 850° C., according to the present invention.
Figure 33:
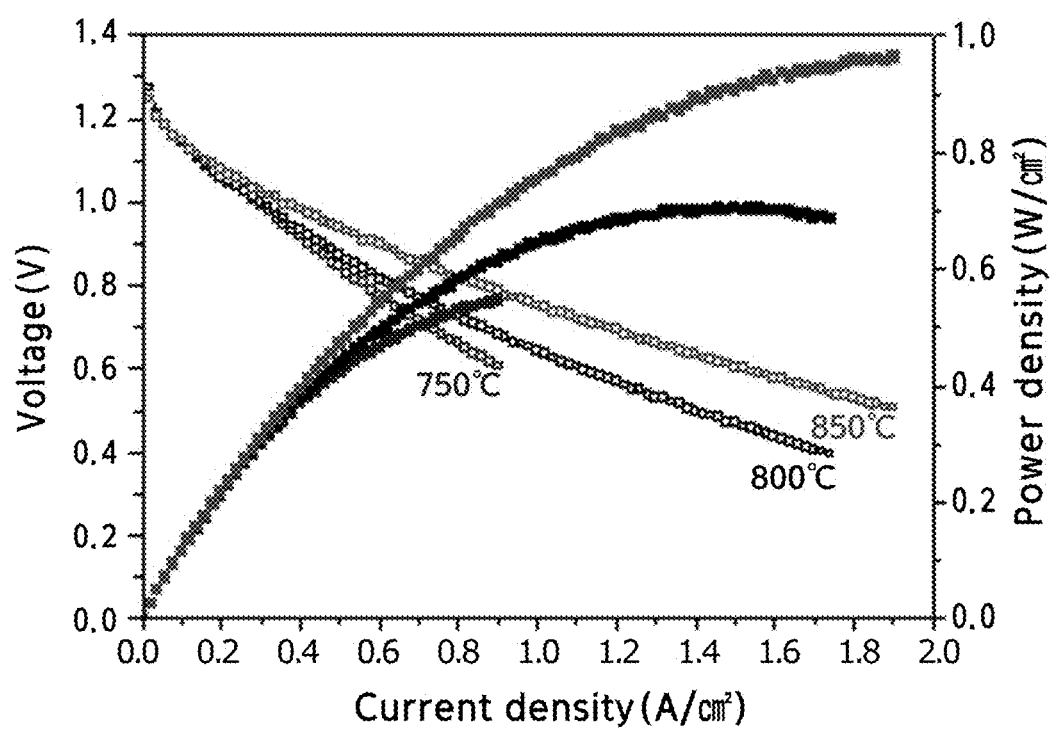
FIG. 33 is a graph illustrating the power density of ESC including the LSCF cathode and the SYBC electrolyte as the buffer layer, operated at 750° C., 800° C. and 850° C., according to the present invention.

FIG. 32 is a graph illustrating the power density when the ESC including the LSM cathode according to the present invention is operated at 750° C., 800° C. and 850° C., and FIG. 33 is a graph illustrating the power density when the ESC including the LSCF cathode and the SYBC electrolyte as the buffer layer according to the present invention is operated at 750° C., 800° C. and 850° C.

The single cell including the LSM cathode exhibited a maximum power density of 0.65 W/$cm^2$ under the condition of a current density of about 1.6 A/$cm^2$ at 850° C. and a power density of about 0.55 W/$cm^2$ under the condition of a rating voltage of 0.7 V.

Meanwhile, the single cell including the LSCF cathode and the SYBC buffer layer exhibited a maximum power density of 0.95 W/$cm^2$ under the condition of a current density of about 1.8 A/$cm^2$ at 850° C. and a power density of about 0.85 W/$cm^2$ under the condition of a rating voltage of 0.7 V. Accordingly, the power density was increased about 45%.

According to the present invention, the ceria-based electrolyte is useful as a ceria-based buffer layer for preventing the interfacial reaction between the MIEC cathode and the zirconia-based electrolyte in a high-power solid oxide fuel cell. Compared to conventional ceria-based buffer layer materials including Sm-doped $CeO_2$ (SDC) or Gd-doped $CeO_2$ (GDC), the ceria-based electrolyte of the invention can undergo low-temperature sintering, and has a controlled average cation radius, thus ensuring ionic conductivity equivalent to that of conventional SDC or GDC electrolyte material.

According to the present invention, the ceria electrolyte is configured such that either Gd or Sm is co-doped with Bi and Yb, thus assuring low-temperature sintering properties due to the introduction of Bi and controlling the average cation radius due to the introduction of Yb to assure oxygen ionic conductivity.

Moreover, the diffusion of the zirconia-based electrolyte and the ceria-based electrolyte owing to high-temperature sintering can be prevented, and the buffer layer can be stably formed through low-temperature sintering. As the novel ceria-based buffer layer is introduced, the power of the solid oxide fuel cell can be increased 30% or more.

As mentioned hereinbefore, although the preferred embodiments of the present invention have been disclosed herein and in the drawings, those skilled in the art will appreciate that various modifications, additions and substitutions are possible, without departing from the scope and spirit of the invention as disclosed in the accompanying claims.

What is claimed is:

1. A ceria ($CeO_2$) electrolyte for low-temperature sintering, suitable for use in a solid oxide fuel cell, comprising:
    samarium (Sm), ytterbium (Yb), and bismuth (Bi), which are simultaneously co-doped to exhibit a sintering density of 95% or more at a sintering temperature of 1200° C.,
    wherein the ceria ($CeO_2$) electrolyte being simultaneously co-doped with Gd, the Yb, the Bi has an average cation radius of 0.98 to 0.99 Å and a composition of Chemical Formula 1 below:

$$Sm_xYb_yBi_zCe_{1-x-y-z}O_{2-\delta} \qquad \text{[Chemical Formula 1]}$$

$0.1 \leq X \leq 0.17$, $0.005 \leq Y \leq 0.05$, $0.005 \leq Z \leq 0.05$, $0.11 \leq X+Y+Z \leq 0.27$, $\delta=(X+Y+Z)/2$.

2. A solid oxide fuel cell, comprising:
    an anode;
    a zirconia electrolyte, formed through co-sintering with the anode;
    a ceria buffer layer, formed by coating a surface of the zirconia electrolyte with the ceria electrolyte of claim 1 and performing thermal treatment at 1100 to 1200° C.; and
    a cathode, formed through coating and thermal treatment on a surface of the ceria buffer layer.

3. The solid oxide fuel cell of claim 2, wherein the cathode comprises 50 to 70 wt % of a mixed conductor having a perovskite ($ABO_3$)-based crystal structure or a mixed conductor having a double-layer perovskite ($ABC_2O_{5+\delta}$)-based crystal structure and 30 to 50 wt % of a ceria-based electrolyte, and the ceria-based electrolyte has a composition of Chemical Formula 1 below:

$$Sm_xYb_yBi_zCe_{1-x-y-z}O_{2-\delta} \qquad \text{[Chemical Formula 1]}$$

$0.1 \leq X \leq 0.17$, $0.005 \leq Y \leq 0.05$, $0.005 \leq Z \leq 0.05$, $0.11 \leq X+Y+Z \leq 0.27$, $\delta=(X+Y+Z)/2$.

4. The solid oxide fuel cell of claim 2, wherein the cathode comprises 50 to 70 wt % of a mixed conductor having a perovskite ($ABO_3$)-based crystal structure or a mixed conductor having a double-layer perovskite ($ABC_2O_{5+\delta}$)-based crystal structure and 30 to 50 wt % of a ceria-based electrolyte, and the ceria-based electrolyte has a composition of Chemical Formula 2 below:

$$Re_xCe_{1-x}O_{2-\delta}, \qquad \text{[Chemical Formula 2]}$$

Re=at least one element selected from among Gd, Sm, Y, Nd, and Pr, $0.05 \leq X \leq 0.2$, $\delta=X/2$.

* * * * *